US010619530B2

(12) United States Patent
Dries et al.

(10) Patent No.: US 10,619,530 B2
(45) Date of Patent: Apr. 14, 2020

(54) THERMAL MANAGEMENT UNIT FOR VEHICLE POWERTRAIN

(71) Applicant: Modine Manufacturing Company, Racine, WI (US)

(72) Inventors: Christopher Dries, Oak Creek, WI (US); Andrew Boyer, Cudahy, WI (US); Ashutosh Patil, Racine, WI (US); Daniel Raduenz, Franklin, WI (US); Danny Berg, South Lyon, MI (US)

(73) Assignee: MODINE MANUFACTURING COMPANY, Racine, WI (US)

( * ) Notice: Subject to any disclaimer, the term of this patent is extended or adjusted under 35 U.S.C. 154(b) by 121 days.

(21) Appl. No.: 15/545,002

(22) PCT Filed: Jan. 22, 2016

(86) PCT No.: PCT/US2016/014429
§ 371 (c)(1),
(2) Date: Jul. 20, 2017

(87) PCT Pub. No.: WO2016/122970
PCT Pub. Date: Aug. 4, 2016

(65) Prior Publication Data
US 2018/0274406 A1 Sep. 27, 2018

Related U.S. Application Data

(63) Continuation-in-part of application No. 14/605,294, filed on Jan. 26, 2015, now Pat. No. 10,087,793.

(51) Int. Cl.
*F01M 5/00* (2006.01)
*F01P 3/12* (2006.01)
(Continued)

(52) U.S. Cl.
CPC ............ *F01M 5/007* (2013.01); *F01M 5/001* (2013.01); *F01M 5/002* (2013.01); *F01P 3/12* (2013.01);
(Continued)

(58) Field of Classification Search
CPC ........ F01M 5/001; F01M 5/005; F01M 5/007; F01P 3/12; F01P 7/16; F15B 21/042;
(Continued)

(56) References Cited

U.S. PATENT DOCUMENTS 2,454,297 A    11/1948   Worth
2,540,629 A     2/1951   Miller
(Continued)

FOREIGN PATENT DOCUMENTS

CN    101529357 A    9/2009
EP       0736703 B1   1/1996
(Continued)

OTHER PUBLICATIONS

Notification of the First Office Action for Chinese Patent Application No. 2016800073391, The State Intellectual Property Office of the People's Republic of China, dated Aug. 24, 2018 (7 pages).
(Continued)

*Primary Examiner* — Travis C Ruby
(74) *Attorney, Agent, or Firm* — Michael Best & Friedrich LLP; Jeroen Valensa; Michael Bergnach

(57) ABSTRACT

A thermal management unit for a vehicle powertrain includes an integrated oil heater, a control valve, and a pressure relief valve. A remote oil cooler is connected to fluid ports of the thermal management unit. Transmission oil is received into the thermal management unit and is directed to one or both of the transmission oil heater and the transmission oil cooler. A portion of the flow of oil can be internally bypassed through the pressure relief valve to
(Continued)

maintain the pressure of the oil below a threshold. The flow of oil is directed through the control valve after having been heated and/or cooled, and the proportions of oil being directed through the oil heater and the oil cooler are determined by the temperature of the oil in the control valve.

14 Claims, 13 Drawing Sheets

(51) Int. Cl.
　　　*F01P 7/16*　　　(2006.01)
　　　*F16H 57/04*　　　(2010.01)
　　　*F28F 27/02*　　　(2006.01)
　　　*F28D 9/00*　　　(2006.01)
　　　F28D 21/00　　　(2006.01)
　　　F28F 9/02　　　(2006.01)
　　　F28F 3/04　　　(2006.01)

(52) U.S. Cl.
　　　CPC ............. *F01P 7/16* (2013.01); *F16H 57/0417* (2013.01); *F16H 57/0475* (2013.01); *F28D 9/005* (2013.01); *F28F 27/02* (2013.01); *F28D 2021/0089* (2013.01); *F28F 3/044* (2013.01); *F28F 9/0258* (2013.01); *F28F 2250/06* (2013.01); *F28F 2280/06* (2013.01)

(58) Field of Classification Search
　　　CPC ............... F15B 21/045; F16H 57/0413; F16H 57/0417; F16H 57/0475; F28D 9/005; F28D 2021/0089; F28F 3/086; F28F 3/044; F28F 9/0258; F28F 27/00; F28F 27/02; F28F 2250/06; F28F 2280/06
　　　See application file for complete search history.

(56) References Cited

U.S. PATENT DOCUMENTS

| | | |
|---|---|---|
| 3,315,464 A | 4/1967 | Hayden |
| 3,401,605 A | 9/1968 | Born |
| 3,682,380 A | 8/1972 | Asis |
| 4,190,198 A | 2/1980 | Casuga et al. |
| 4,537,346 A | 8/1985 | Duprez |
| 5,385,296 A | 1/1995 | Kurz et al. |
| 5,638,774 A | 6/1997 | Albertson et al. |
| 5,749,439 A | 5/1998 | Van Maanen |
| 6,012,550 A | 1/2000 | Lee |
| 6,196,168 B1 | 3/2001 | Eckerskorn et al. |
| 6,401,670 B2 | 6/2002 | Frunzetti et al. |
| 6,427,640 B1 | 8/2002 | Hickey et al. |
| 6,499,666 B1 | 12/2002 | Brown |
| 6,527,046 B1 | 3/2003 | White |
| 6,575,707 B2 | 6/2003 | Matt et al. |
| 6,772,715 B2 | 8/2004 | Pfeffinger et al. |
| 6,830,527 B2 | 12/2004 | Wakayama |
| 7,267,084 B2 | 9/2007 | Lutze et al. |
| 7,487,826 B2 | 2/2009 | Pineo et al. |
| 7,540,431 B2 | 6/2009 | Kozdras et al. |
| 7,665,513 B2 | 2/2010 | Sasaki |
| 7,721,972 B2 | 5/2010 | Bracken et al. |
| 7,748,442 B2 | 7/2010 | Kalbacher et al. |
| 8,066,197 B2 | 11/2011 | Sheppard |
| 8,066,198 B2 | 11/2011 | Palanchon et al. |
| 8,083,209 B2 | 12/2011 | Kozdras et al. |
| 8,116,953 B2 | 2/2012 | Lopez |
| 8,141,790 B2 | 3/2012 | Sheppard |
| 8,342,418 B2 | 1/2013 | Kanzaka et al. |
| 8,539,983 B2 | 9/2013 | Kozdras et al. |
| 8,622,120 B2 | 1/2014 | Gerundt et al. |
| 8,631,772 B2 | 1/2014 | Gooden et al. |
| 8,991,719 B2 | 3/2015 | Sheppard |
| 2006/0016900 A1 | 1/2006 | Brown et al. |
| 2008/0029246 A1 | 2/2008 | Fratantonio et al. |
| 2008/0041971 A1 | 2/2008 | Trantham et al. |
| 2010/0181516 A1 | 7/2010 | Palanchon et al. |
| 2012/0152516 A1 | 6/2012 | Pineo et al. |
| 2012/0161042 A1 | 6/2012 | Sheppard et al. |
| 2013/0042927 A1 | 2/2013 | Neelakantan et al. |
| 2013/0152882 A1 | 6/2013 | Potter |
| 2013/0160972 A1 | 6/2013 | Sheppard et al. |
| 2013/0319634 A1 | 12/2013 | Sheppard et al. |
| 2014/0165932 A1 | 6/2014 | Oh |

FOREIGN PATENT DOCUMENTS

| | | |
|---|---|---|
| GB | 2355300 A | 4/2001 |
| JP | 551920 | 1/1980 |
| JP | 379637 B2 | 12/1991 |

OTHER PUBLICATIONS

International Search Report and Written Opinion for Application No. PCT/US2016/014429 dated Mar. 28, 2016 (11 pages).
Supplementary European Search Report for European Patent Application No. 16743881, European Patent Office, dated Aug. 10, 2018 (2 pages).

THERMAL MANAGEMENT UNIT FOR VEHICLE POWERTRAIN

CROSS-REFERENCE TO RELATED APPLICATIONS

This application claims priority to U.S. patent application Ser. No. 14/605,294, filed on Jan. 26, 2015, the entire contents of which are incorporated herein by reference.

BACKGROUND

The invention relates to integrated heat exchanger and valve assemblies, and particularly relates to heat exchanger and valve assemblies for regulating the temperature of fluid for a vehicle powertrain.

Heat exchange systems to regulate the temperature of fluids to be above a minimum threshold, below a maximum threshold, or within a desirable range bounded by a minimum and a maximum threshold are known. Such heat exchange systems typically include one or more heat exchangers and one or more flow control devices to control the flow of fluid to the one or more heat exchangers. Vehicle powertrains in particular require such heat exchange systems in order to properly regulate the temperature of working fluid such as coolant, engine oil, transmission oil, and the like.

With ever increasing incentives to improve overall fuel economy and system efficiency, properly regulating the temperature of fluids within a vehicle powertrain has become of greater importance. Such temperature regulation can require both a heat exchanger to rapidly heat the fluid during cold startup of the vehicle powertrain, and a heat exchanger to reject waste heat accumulated in the fluid during operation of the vehicle powertrain. Control devices (including valves and the like) can be used to selectively route the fluid to the heat exchangers in order to meet these objectives.

Advantages can be found in integrating portions of these heat exchange systems into a thermal management unit, thereby reducing the number of interconnections and simplifying installation of the heat exchange system into the vehicle powertrain.

SUMMARY

According to an embodiment of the invention, a thermal management unit for a vehicle powertrain includes a valve operable to selectively route fluid between a valve outlet and first and second valve inlets, a first fluid port to receive a flow of oil from the vehicle powertrain, a second fluid port to deliver a flow of oil to the vehicle powertrain, a third fluid port fluidly connected to the first fluid port by way of a first flow path extending through the thermal management unit, and a fourth fluid port fluidly connected to one of the first and second valve inlets by way of a second flow path extending through the thermal management unit. The thermal management unit further includes an integrated transmission oil heater having a fluid inlet manifold, a fluid outlet manifold, and a plurality of flow structures extending between the fluid inlet manifold and the fluid outlet manifold. The fluid inlet manifold is fluidly connected to the first fluid port by way of a third flow path extending through the thermal management unit and the fluid outlet manifold is fluidly connected to the other of the first and second valve inlets by way of a fourth flow path extending through the thermal management unit. A fifth flow path extends between and fluidly connects the second fluid port and valve outlet. A shunt flow path extends from the first fluid port and fluidly connects to one of the second flow path, the fourth flow path, and the fifth flow path at an end of the shunt flow path. A pressure relief valve is arranged along the shunt flow path to block the flow of oil along the shunt flow path when the pressure differential between the first fluid port and the end of the shunt flow path is below a threshold, and to allow flow of oil along the shunt flow path when the pressure differential exceeds that threshold.

In some embodiments, the valve includes a sensing element configured to operate the valve in response to the temperature of oil passing over the sensing element, and in some particular embodiments the sensing element is a wax motor. In some embodiments the entire flow of oil entering through the first fluid port is directed over the sensing element.

In some embodiments, the thermal management unit includes a cast structure having a central bore extending linearly therethrough. Both the valve and the pressure relief valve are arranged within the central bore.

In some embodiments, the valve includes a movable shuttle having one or more window apertures arranged therein. In some such embodiments at least some of the one or more window apertures define the valve outlet. In some embodiments at least some of the window apertures define one of the first and second valve inlets, and movement of the movable shuttle operates to open and close that one of the first and second valve inlets.

According to another embodiment of the invention, a method of controlling the temperature of oil for a vehicle powertrain includes receiving a flow of oil from the vehicle powertrain into a thermal management unit at a first pressure, and directing at least some of the flow of oil through at least one of a transmission oil heater and a transmission oil cooler. That flow of oil is received into a valve arranged within the thermal management unit after passing through the at least one of a transmission oil heater and a transmission oil cooler, and any remaining flow of oil is directed through a bypass arranged within the thermal management unit to avoid it passing through either of the transmission oil heater and the transmission oil cooler. The temperature of oil received into the valve is measured, and the flow of oil is returned to the vehicle powertrain from the thermal management unit.

In some embodiments, the oil is received into the valve at a second pressure lower than the first pressure. In some such embodiments the amount of oil passing through the bypass is determined in response to a pressure differential between the first pressure and the second pressure. In some embodiments the step of measuring a temperature of oil includes directing the entire flow of oil received into the thermal management unit over a temperature-responsive element arranged within the valve.

According to another embodiment of the invention, a method of managing oil for a vehicle powertrain includes receiving a flow of oil from the vehicle powertrain into a thermal management unit at a first temperature below a threshold temperature and dividing the flow of oil into a first portion and a second portion. The first portion is directed into a transmission oil heater integrated into the thermal management unit, and is heated. The first portion is then recombined with the second portion, the second portion having bypassed the transmission oil heater, so that the recombined flow is at a second temperature higher than the first temperature. The recombined flow of oil is received into a valve located within the thermal management unit and is passed over a temperature-responsive element arranged within the valve, after which the recombined flow of oil is returned to the vehicle powertrain from the thermal management unit at the second temperature.

In some embodiments the flow of oil is a first flow of oil, and a second flow of oil is received from the vehicle powertrain into the thermal management unit some time after having returned the first flow of oil to the vehicle powertrain. Substantially all of the second flow of oil is directed into the transmission oil heater and is heated. The second flow of oil is received into the valve at a temperature substantially equal to the threshold temperature, and an actuator of the valve is actuated in response to passing the second flow of oil over the temperature-responsive element so that subsequent flows of oil into the thermal management unit are at least partially directed through an oil cooler associated with the vehicle powertrain.

According to another embodiment of the invention, a thermal management unit for routing a flow of oil through a vehicle powertrain includes a valve housing having a first fluid cavity, a second fluid cavity, a valve seat separating the first and second fluid cavities, a first inlet and first and second outlets for the first fluid cavity, a third outlet for the second fluid cavity, and one or more second inlets for the second fluid cavity. A control valve is arranged within the valve housing and includes a temperature sensing element disposed within the second fluid cavity, a movable shuttle disposed within the first fluid cavity and controlled by the temperature sensing element to selectively route fluid between the first inlet and the first and second outlets, and a pressure relief valve element disposed within the second fluid cavity. The pressure relief valve is responsive to a pressure differential between fluid in the first fluid cavity and fluid in the second fluid cavity. The pressure relief valve element directly abuts the valve seat when the pressure differential is below a threshold value, and is displaced from the valve seat when the pressure differential is above the threshold value.

In some embodiments, the movable shuttle has a range of travel bounded by a first position and a second position. Flow between the first fluid cavity and the first outlet is blocked by the movable shuttle in the first position, and flow between the first fluid cavity and the second outlet is blocked by the movable shuttle in the second position.

In some embodiments, the first fluid cavity includes a cylindrical bore. The movable shuttle includes a cylinder that is slidably received within the cylindrical bore. In some embodiments the pressure relief valve element has a planar disc with an aperture. The temperature sensing element includes an actuator, and the actuator extends through the aperture of the planar disc.

According to another embodiment of the invention, a thermal management unit for a vehicle powertrain includes a first fluid port to receive a flow of oil from the vehicle powertrain, a second fluid port to deliver a flow of oil to the vehicle powertrain, a third fluid port fluidly connected to the first fluid port by way of a first flow path extending through the thermal management unit, and a fourth fluid port fluidly connected to the second fluid port by way of a second flow path extending through the thermal management unit. The thermal management unit further includes an integrated transmission oil heater having a fluid inlet manifold, a fluid outlet manifold, and a plurality of flow structures extending between the fluid inlet manifold and the fluid outlet manifold. The fluid inlet manifold is fluidly connected to the first fluid port by way of a third flow path extending through the thermal management unit and the fluid outlet manifold is fluidly connected to the second fluid port by way of a fourth flow path extending through the thermal management unit. A control valve shuttle is movably disposed within the thermal management unit to selectively block flow along one of the third and fourth flow paths and along one of the first and second flow paths. A shunt flow path extends through the thermal management unit between the first and the second fluid ports, and flow through the shunt flow path bypasses the third fluid port, the fourth fluid port, and the integrated transmission oil heater. A pressure relief valve is arranged along the shunt flow path to block the flow of oil along the shunt flow path when the pressure differential between the first and second fluid ports is below a threshold, and to allow flow of oil along the shunt flow path when the pressure differential exceeds that threshold.

In some embodiments, the thermal management unit includes a sensing element arranged within the housing so that fluid flowing along both the second and the fourth fluid flow paths passes over the sensing element. Movement of the control valve shuttle is in response to the temperature sensed by the sensing element. In some embodiments the thermal management unit includes a structure having a central bore extending linearly therethrough, in which both the control valve shuttle and the sensing element are housed. The pressure relief valve divides the central bore into a first fluid volume containing the control valve shuttle and a second fluid volume containing the sensing element.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
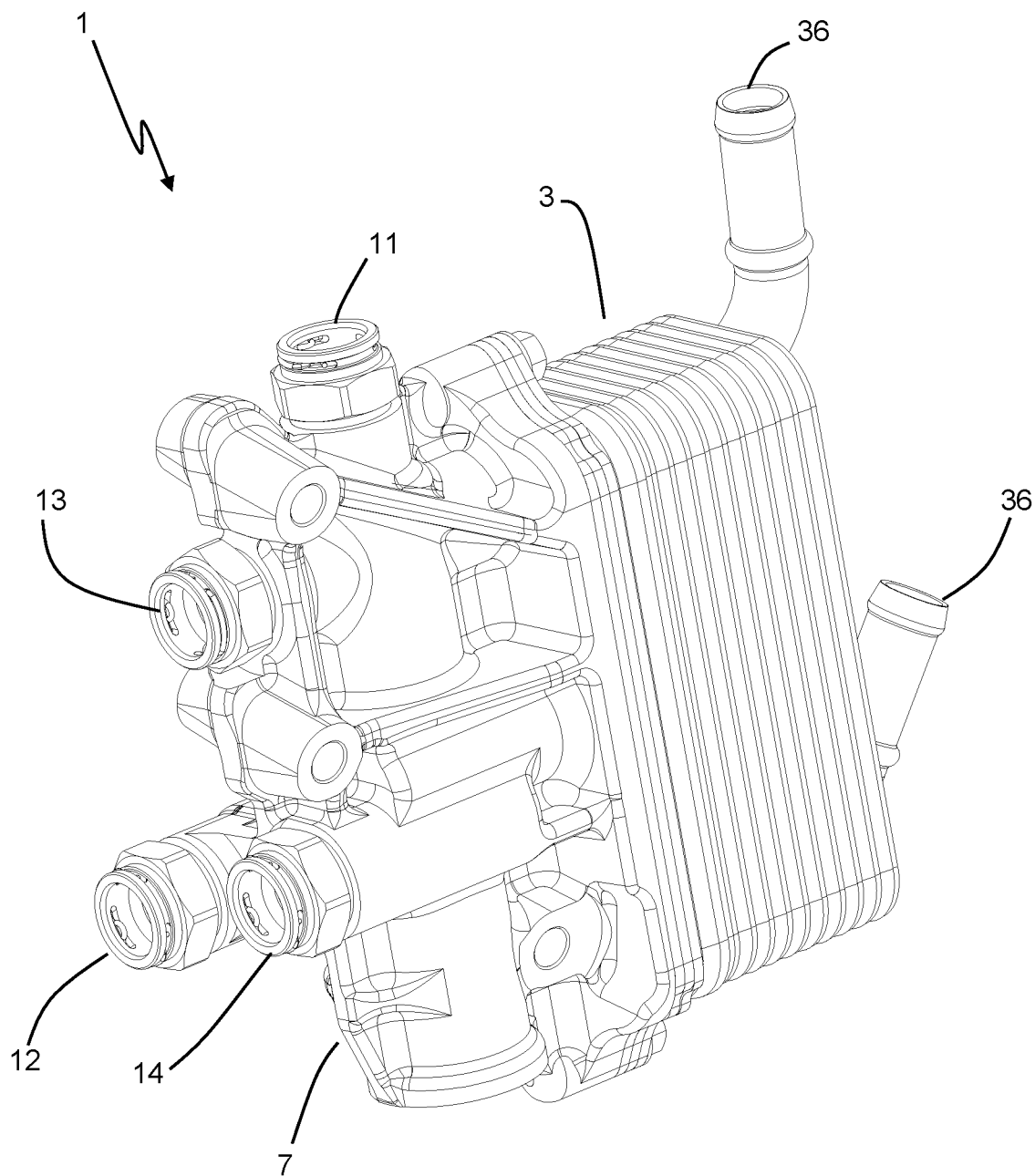
FIG. 1 is a perspective view of a thermal management unit according to an embodiment of the invention.
Figure 2:
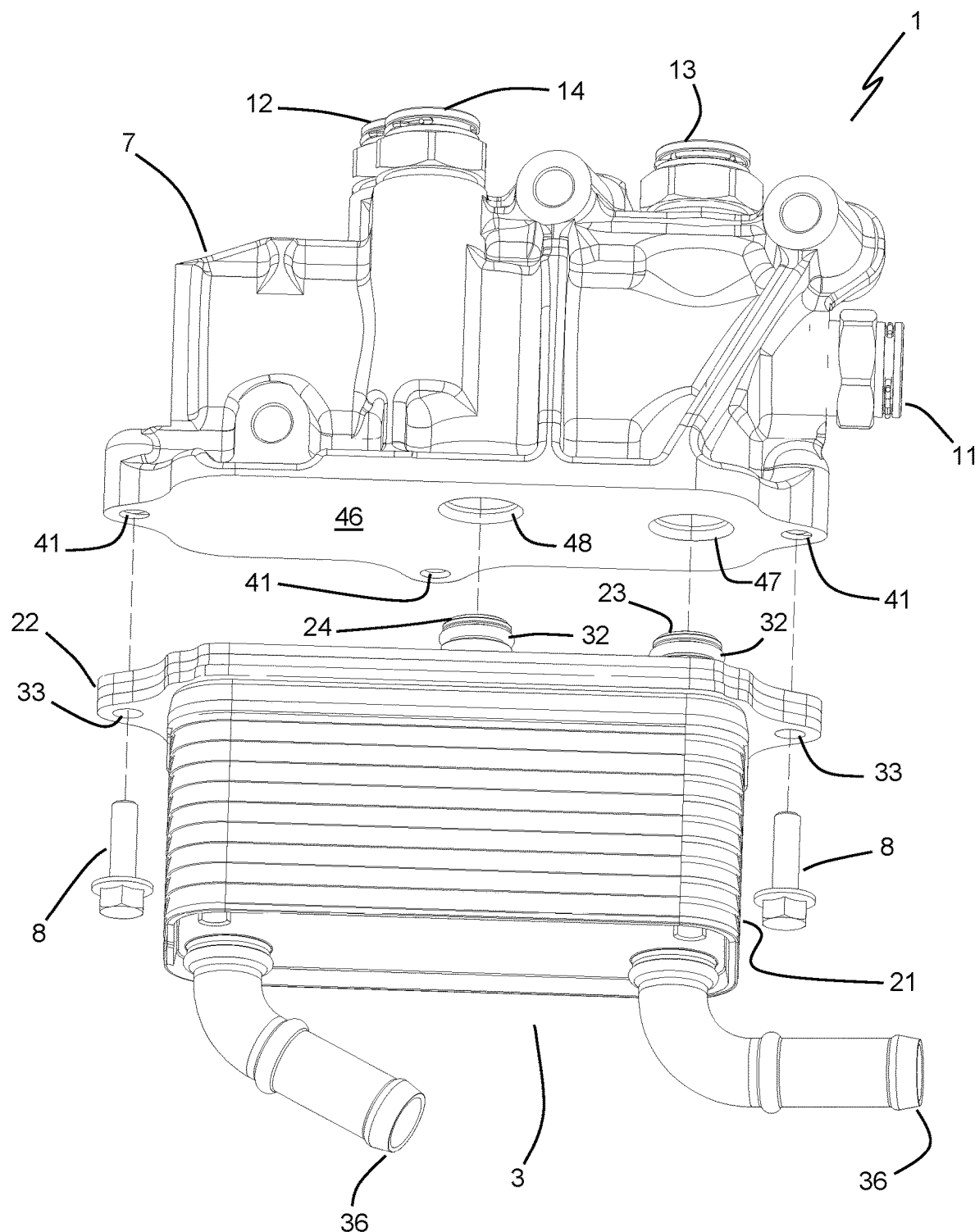
FIG. 2 is a partially exploded perspective view of the thermal management unit of FIG. 1.
Figure 3:
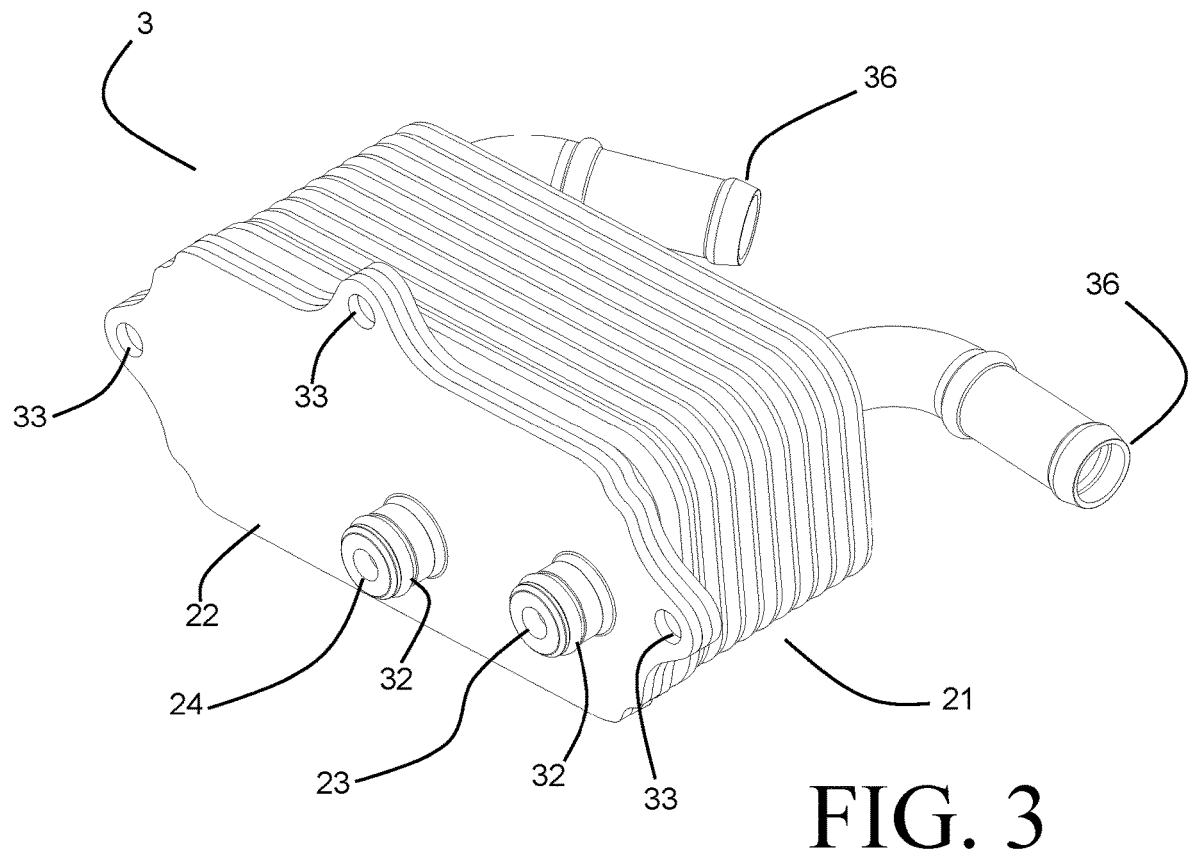
FIG. 3 is a perspective view of a heat exchanger that is part of the thermal management unit of FIG. 1.

A thermal management unit 1 according to an embodiment of the invention is shown in FIG. 1 and is especially well suited for use with the powertrain of a vehicle such as an automobile, truck, bus, agricultural or construction equipment, etc. The vehicle powertrain, as referred to in this context, includes those vehicle sub-systems responsible for producing motion of the vehicle, and includes (without limitation) the engine, transmission, brakes, and power steering. The thermal management unit 1 can be employed to maintain the operating temperature of a working fluid of the vehicle powertrain within an acceptable range. A particular working fluid for which the thermal management unit 1 is especially well suited is the oil commonly referred to as automatic transmission fluid, which is used within the vehicle powertrain as both a lubricant and a hydraulic fluid. This oil has been developed with specific properties (e.g. viscosity, lubricity, temperature capability) in order to both withstand the harsh operating environments of vehicle powertrains, and to optimize the performance of the powertrain. Some of these properties vary considerably with temperature, and it can therefore be especially important for the operating temperature of the oil to be maintained within a fairly narrow range for optimum performance and lifetime.

Figure 13:
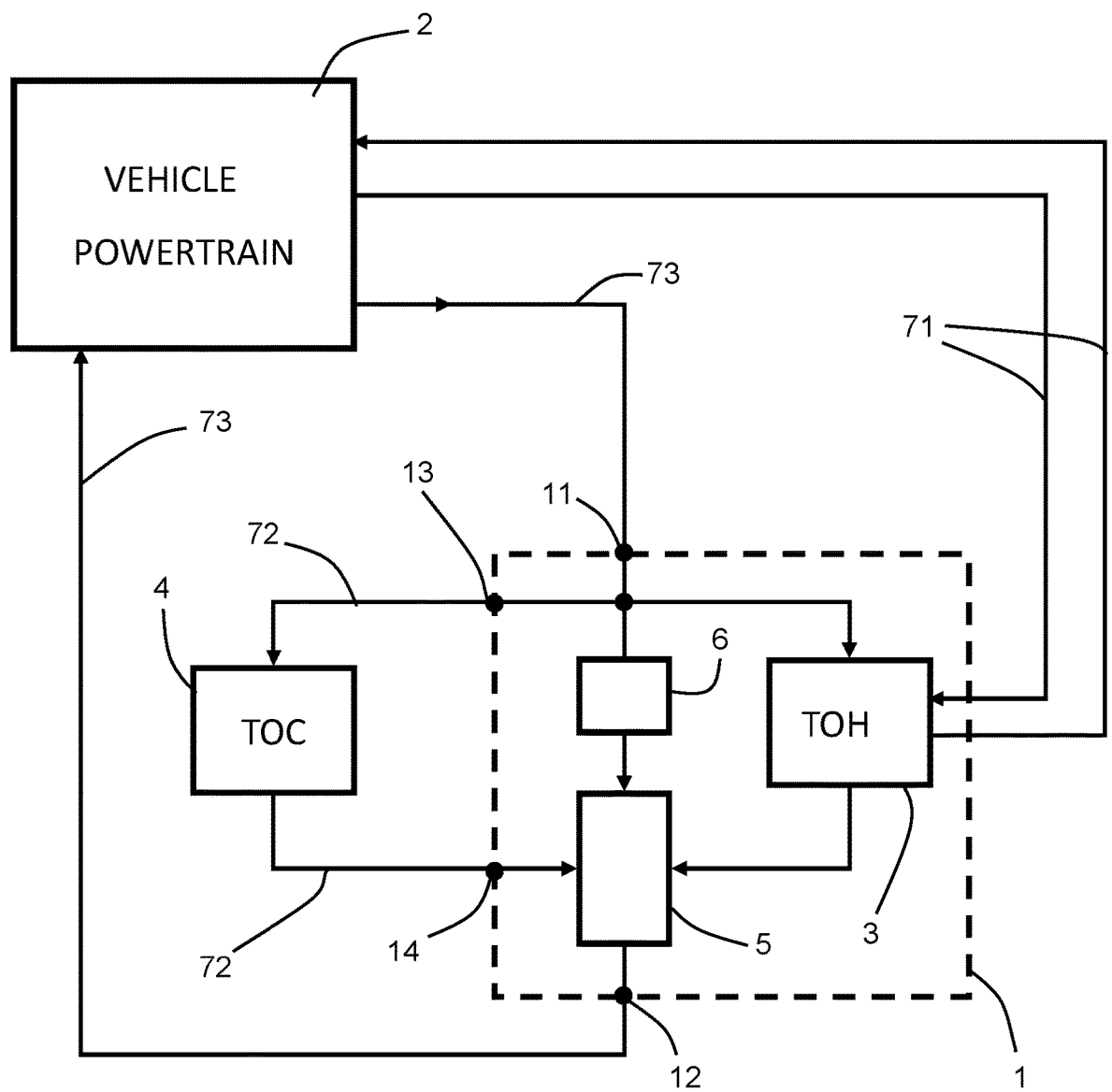
FIG. 13 is a diagrammatic view of a thermal management unit coupled to a vehicle powertrain according to an embodiment of the invention.

The diagram of FIG. 13 illustrates an exemplary manner by which the thermal management unit 1 can be fluidly coupled to a vehicle powertrain 2. Oil from the vehicle powertrain is routed to and from the thermal management unit 1 by way of fluid lines 73, a first of which connects to an inlet port 11 of the thermal management unit 1, and a second of which connects to an outlet port 12 of the thermal management unit 1. Oil that is received into the thermal management unit 1 by way of the inlet port 11 can be routed to a transmission oil heater 3 integrated with the thermal management unit 1, and/or to a transmission oil cooler 4 that can be located remotely from the thermal management unit 1. Alternatively, or in addition, at least some of the oil received through the inlet port 11 can bypass both the transmission oil heater 3 and the transmission oil cooler 4 by passing through a pressure relief valve 6 arranged within the thermal management unit 1 and to the outlet port 12. A control valve 5 is additionally arranged within the thermal management unit 1 and can receive the oil from each of the three possible flow paths in order to deliver the oil to the outlet port 12. The control valve 5 operates to selectively determine the proportions of oil flow through the transmission oil cooler 4 and the transmission oil heater 3, as will be described in further detail with respect to the specific embodiment of FIG. 1. Alternatively, the control valve 5 operates to control the flow of oil from the transmission oil cooler 4 and/or the transmission oil heater 3 to the vehicle powertrain 2.

The transmission oil cooler 4 is a heat exchanger that is configured to reject heat from the oil in order to maintain the operating temperature of the oil below an upper threshold temperature. Such a heat exchanger is typically configured as an air-cooled heat exchanger that forms part of a vehicle cooling module, although other heat exchanger arrangements could alternatively be used depending upon the specifics of the vehicle application. Fluid lines 72 provide for coupling between the transmission oil cooler 4 and ports 13 and 14 of the thermal management unit 1 in order to enable the flow of oil to and from the transmission oil cooler 4.

The transmission oil heater 3 is a heat exchanger that is configured to provide heat to the oil in order to maintain the operating temperature of the oil above a lower threshold temperature. Such a heat exchanger is especially beneficial during startup of the vehicle powertrain, when the oil is likely to be cold. The viscosity of the oil is typically optimized for performance at the elevated operating temperature of the vehicle powertrain, and at lower temperatures the oil typically has a substantially higher viscosity. When the vehicle has been in a non-operating condition for hours in a low-temperature ambient environment the oil is likely to have cooled to a temperature at which the viscosity is many times greater than that optimized viscosity. In order to maintain proper operation of the vehicle powertrain, it is important for the oil to be circulating therethrough even when the oil is not yet up to its proper operating temperature. The circulation of the oil is typically accomplished by an oil pump forming part of the vehicle powertrain 2.

Circulation of the highly viscous cold oil requires substantially greater work input than circulation of the oil at proper operating temperature, resulting in substantial fuel economy reduction over that time period when the oil is not yet within its desired temperature range. Owing at least in part to the high thermal mass of the vehicle powertrain 2, it is not uncommon for the oil to have not yet reached that desirable operating temperature by the time the vehicle has reached its destination and is stopped, at which point the vehicle might remain in a non-operating condition for sufficient time to return the vehicle powertrain 2, and the oil, to the initial low temperatures so that the entire cycle repeats itself. As a consequence, the overall fuel economy of the vehicle can be severely compromised.

This situation can be remedied by facilitating the rapid warm-up of the oil through the use of the transmission oil heater 3. Coolant that is rapidly heated within the vehicle powertrain 2 (by, for example, being circulated directly over the cylinder heads of the engine of the vehicle powertrain 2) is routed to and from the transmission oil heater 3 by way of coolant lines 71 extending between the vehicle powertrain 2 and the thermal management unit 1. The coolant and the oil are both circulated through the transmission oil heater 3 in order to effect the rapid and efficient transfer of heat to the oil, thereby facilitating a more rapid warming of the oil to the desired operating temperature range.

The embodiment of FIG. 1 will now be described in further detail, with additional reference to the FIGS. 2-12. The thermal management unit 1 includes a cast housing 7 that is joined to a layered core heat exchanger 3 functioning as a transmission oil heater. Fluid ports 11 and 12 are provided within the cast housing 7 to provide for fluid couplings to respectively receive oil from, and return oil to, a vehicle powertrain. In addition, ports 13 and 14 are provided within the cast housing 7 to allow for fluid connections to a remotely located transmission oil cooler.

The transmission oil heater 3 of the exemplary embodiment is of a construction style wherein nested shells are arranged into a stack 21 which is joined to a base plate 22. An inlet port 23 and an outlet port 24 extend from the base plate 22 and sealingly engage (through the use of o-ring type seals 32) with apertures 47 and 48, respectively. The apertures 47 and 48 are provided within a mounting surface 46 of the cast housing 7, and the base plate 22 is secured to the mounting surface 46 through threaded fasteners 8, which extend through mounting holes 33 provided within the base plate 22 and engage corresponding threaded holes 41 of the cast housing 7. Alternatively, such securing of the transmission oil heater 3 to the housing 7 can be accomplished by other means such as spring clips, welding, etc.

Figure 4:
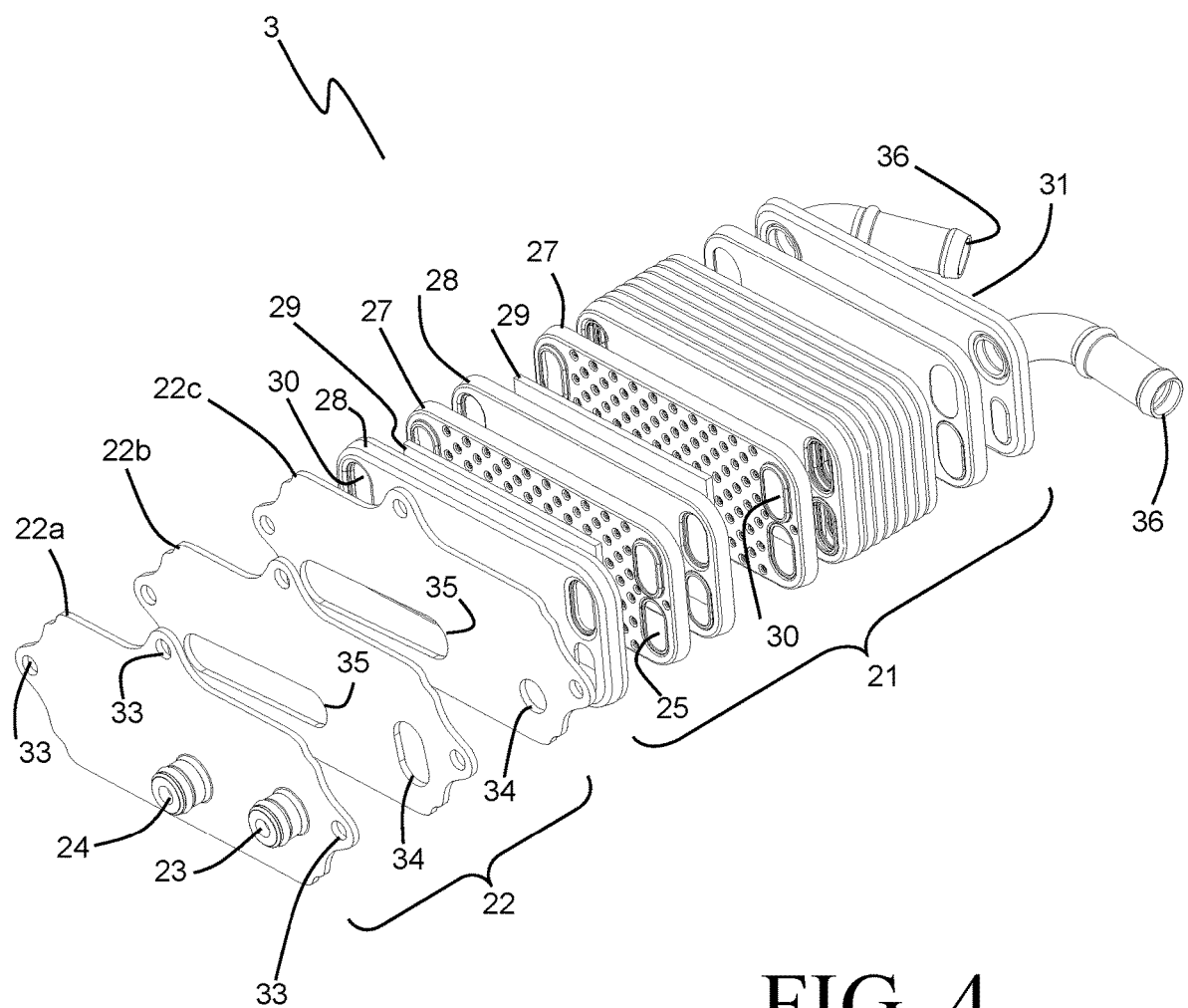
FIG. 4 is an exploded perspective view of the heat exchanger of FIG. 3.
Figure 5:
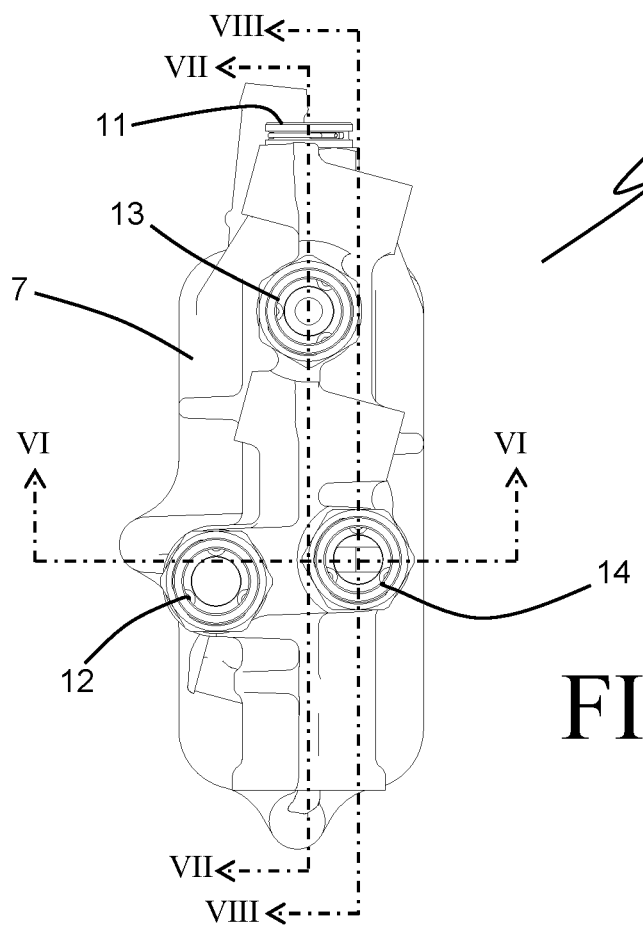
FIG. 5 is a top view of the thermal management unit of FIG. 1.

As best seen in the exploded view of FIG. 4, the stack 21 includes alternating dimpled shells 27 and un-dimpled shells 28 with corresponding upturned peripheral flanges to allow the shells to nest together while providing space for fluid flow between the flat surfaces of adjacent shells. Manifolds 30 extend through the shells at two of the corners of the stack 21 at opposing short ends of the shells, with one of the manifolds 30 acting as an inlet manifold for the coolant and the other acting as an outlet manifold. The end of the stack 21 is closed off with a cap plate 31 that includes two coolant ports 36, each of which communicates with one of the coolant manifolds 30. Dimples of the dimpled shells 27 extend towards the flat surface of an adjacent un-dimpled shell 28, and the spaces between the dimples provide a coolant flow path between the coolant manifolds 30.

An oil inlet manifold 25 is provided at another of the corners of the shells, and an oil outlet manifold 26 is provided at the remaining corner. Flow plates 29 are received within the un-dimpled shells 28 and provide an oil flow path between the manifolds 25 and 26. The flow plates 29 can be, for example, lanced and offset fin plates that provide a tortuous flow path through the stack 21 in order to maximize the rate of heat transfer.

The base plate 22 is formed from three individual plates 22a, 22b, 22c. A channel 35 is formed within the plates 22b and 22c to fluidly connect the outlet port 24 with the oil outlet manifold 26. Similarly, a channel 34 is formed within the plates 22b and 22c to fluidly connect the inlet port 23 with the oil inlet manifold 25. It should be understood, though, that in alternative embodiments the baseplate 22 can be constructed of a differing number of plates, and that in some embodiments the baseplate 22 can consist of a single plate.

The components of the transmission oil heater 3 are, in some especially preferred embodiments, aluminum alloy components, with at least some of the components having been clad with a braze alloy so that the transmission oil heater 3 can be entirely or substantially formed by brazing together the components.

During operation, a flow of coolant that has been heated by the vehicle powertrain 2 is circulated through a coolant line 71 to one of the ports 36 provided on the transmission oil heater 3, and is subsequently received into the coolant manifold 30 that is in direct fluid communication with that one of the ports 36. The coolant flow paths formed between the dimpled surfaces of the dimpled shells 27 and the facing surfaces of the un-dimpled shells 28 are in fluid communication with the coolant manifolds 30, so that the flow of coolant received into the transmission oil heater 3 can be circuited through the heater along those multiple flow paths. Simultaneously, a flow of transmission oil can be received into the transmission oil heater 3 by way of the port 23, and can be routed through the channel 34 towards the inlet manifold 25. Flow paths for the oil, formed by the flow plates 29, are in fluid communication with the inlet manifold 25 and the outlet manifold 26, and the oil received into the inlet manifold 25 is circulated through the transmission oil heater 3 along those flow paths. As the two fluid move through the transmission oil heater 3, heat from the coolant flow is transferred through the shells 27, 28 to the oil flow in order to heat the oil flow. The heated oil is collected in the outlet manifold 26, and is directed through the channel 35 in order to be removed from the transmission oil cooler 4 through the port 24. The cooled coolant is received into the other coolant manifold 30, and is removed through the other coolant port 36 to be returned back to the vehicle powertrain 2 along another coolant line 71.

It should be understood by those having skill in the art that the transmission oil heater 3 shown in the figures and described herein is but one exemplary heat exchanger that is especially well-suited for the purpose described. Details of the heat exchanger construction can vary from those described, and the details of the heat exchanger construction are not intended as a limitation upon the present invention.

Figure 7:
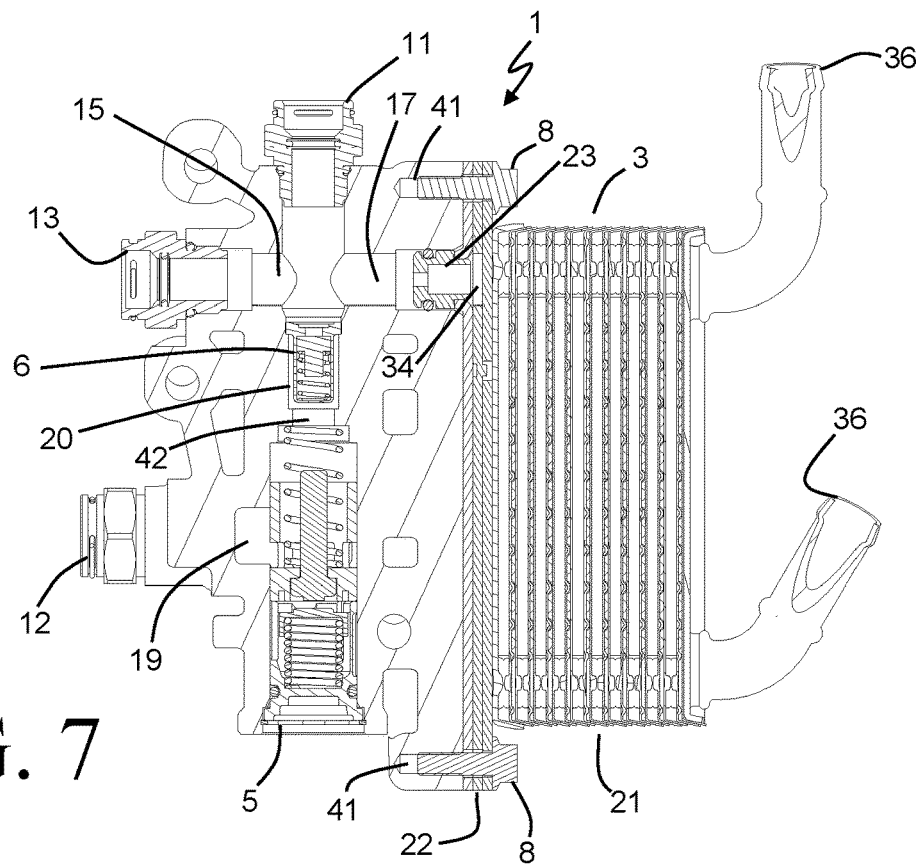
FIG. 7 is a sectional side view of the thermal management unit of FIG. 1, viewed along the lines VII-VII of FIG. 5.

As the flow of oil is received into the thermal management unit 1 through the port 11, internal flow channels within the housing 7 allow for the flow to be directed to multiple locations. As best seen in FIG. 7, a flow path 17 fluidly connects the port 11 with the inlet port 23 of the transmission oil heater 3, so that at least some of the flow of oil can be directed into the transmission oil heater 3. Another flow path 15 fluidly connects to the port 13, which can be used as a connection port for a fluid line 72 that connects the thermal management unit 1 to a remote transmission oil cooler 4. In this way, the flow of oil received into the thermal management unit 1 can be routed towards either the transmission oil cooler 4, the transmission oil heater 3, or both.

The inlet port 11 is arranged at one end of a central bore 42 that extends through the housing 7. Arranged within the central bore 42 are a pressure relief valve 6 and a control valve 5. Stepped diameter changes of the central bore 42 allow for the pressure relief valve 6 and the control valve 5 to be properly situated and retained within the housing 7. The pressure relief valve 6 is inserted from the end of the central bore 42 corresponding with the location of the inlet port 11, while the control valve 5 is inserted from the opposing end. A snap ring 53 is inserted into a snap ring groove 43 in order to secure the control valve 5 within the central bore 42.

Figure 10A:
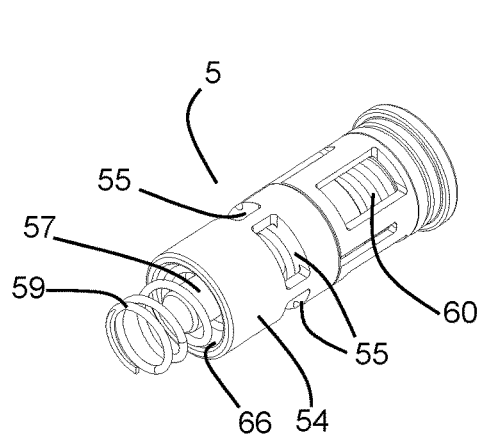
FIGS. 10A and 10B are perspective views of a control valve of the thermal management unit of FIG. 1, shown in two different operating states.
Figure 10B:
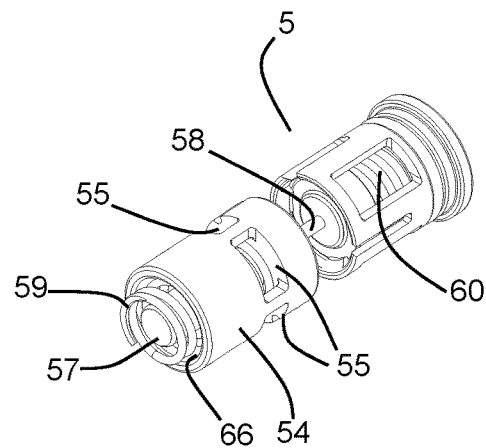
Figure 11A:
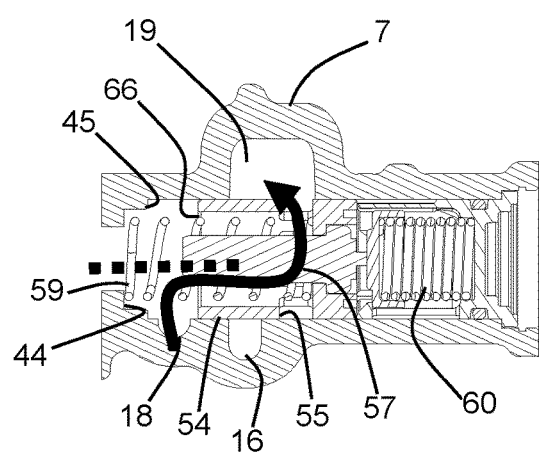
FIGS. 11A and 11B are sectional side views of the installed control valve of FIGS. 10A and 10B in the two different operating states.
Figure 11B:
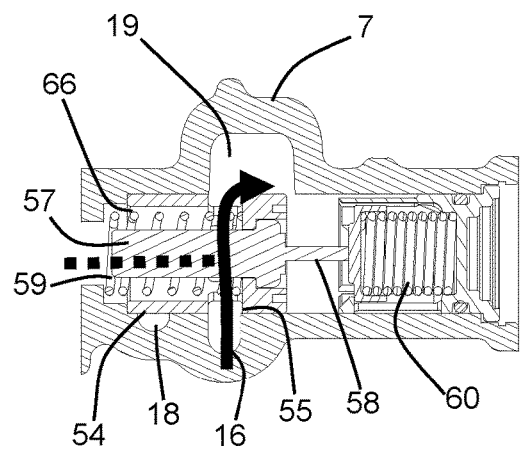

The control valve 5 includes a movable shuttle 54 that travels along a longitudinal axis of the control valve 5 between a first operational state position depicted in FIG. 10A and FIG. 11A, and a second operational state position depicted in FIG. 10B and FIG. 11B. A sensing element 57 is centrally located within the movable shuttle 54, and contains an actuator 58 that is responsive to the temperature measured by the sensing element 57. In the exemplary embodiment the sensing element 57 is a wax motor, and contains a quantity of wax that is specifically formulated to undergo a phase change at a predefined threshold temperature. The phase change results in an increase of volume of the wax, which causes the actuator 58 to extend and displace the movable shuttle 54. A coil spring 59 is located between the movable shuttle 54 and a shoulder 44 of the central bore 42, so that the movement of the shuttle 54 caused by the extension of the actuator 58 compresses the spring 59. The spring 59 provides a restoring force to return the movable shuttle 54 back to its first operational state position when the actuator 58 retracts in response to a reduction of temperature sufficient to reverse the phase change of the wax motor.

Figure 6:
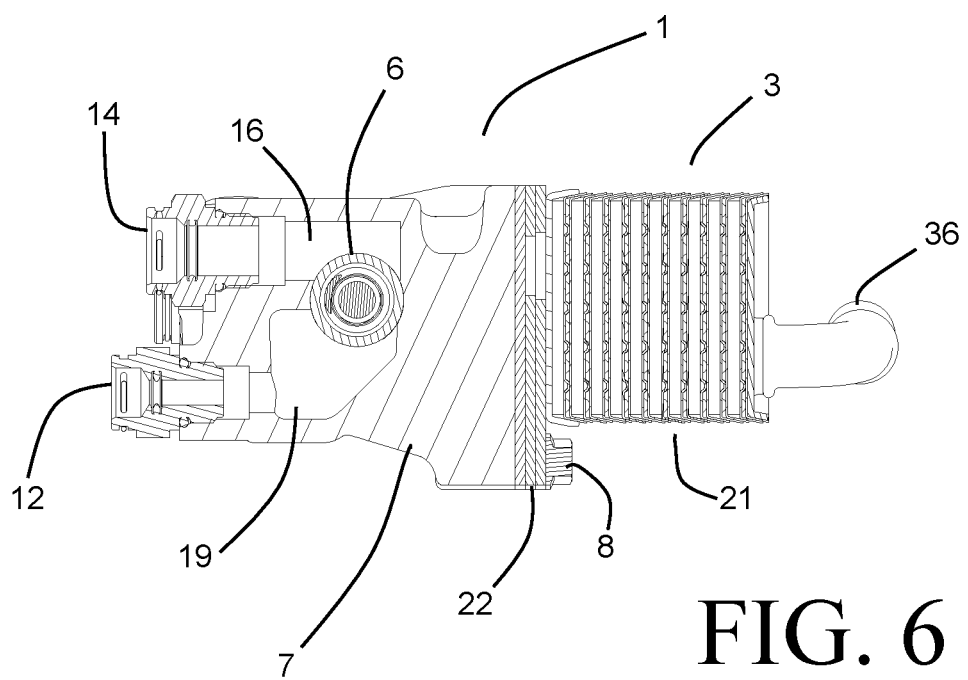
FIG. 6 is a sectional end view of the thermal management unit of FIG. 1, viewed along the lines VI-VI of FIG. 5.
Figure 9:
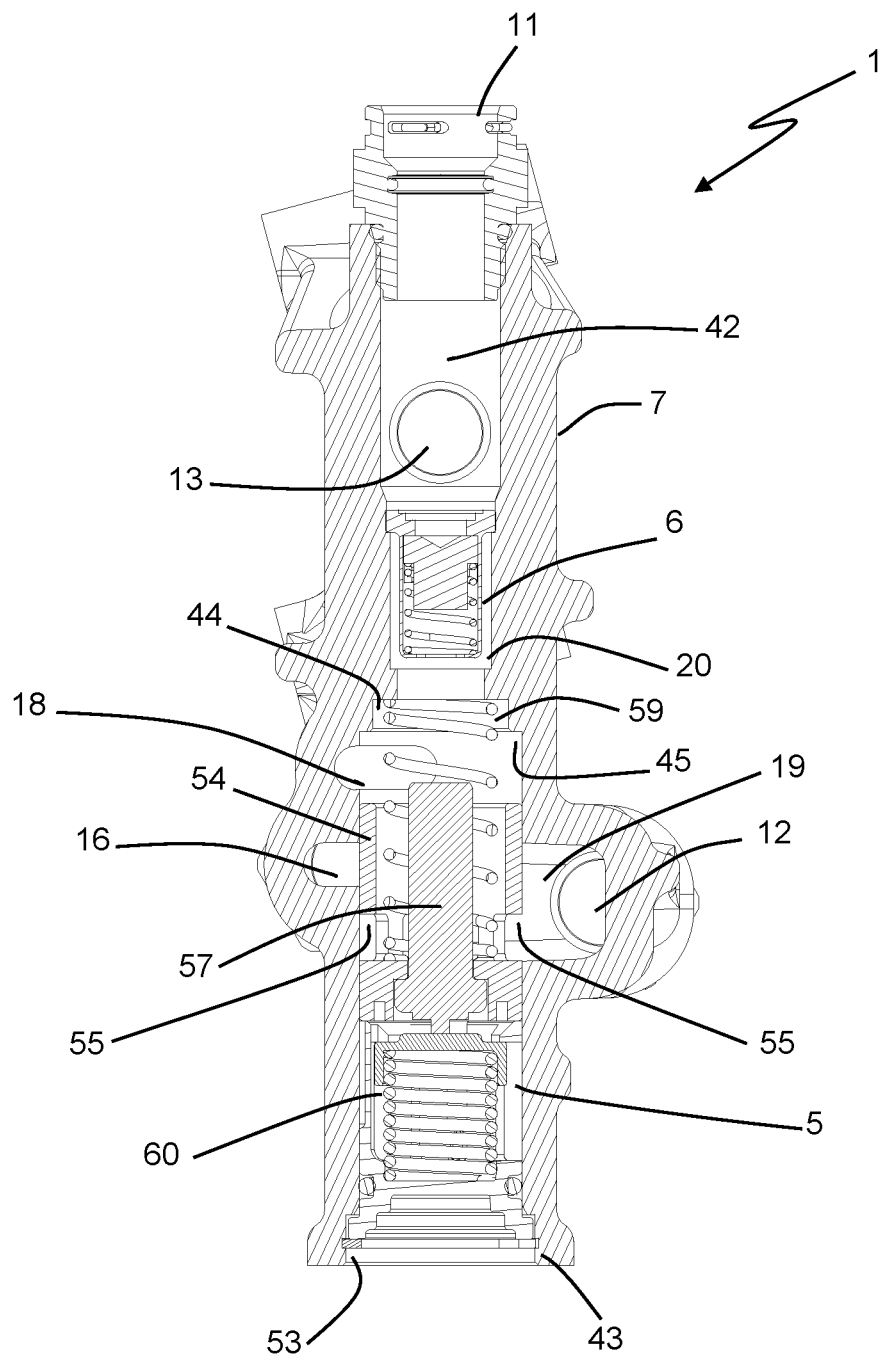
FIG. 9 is a sectional bottom view of the thermal management unit of FIG. 1, viewed along the lines IX-IX of FIG. 8.

The movable shuttle 54 is provided with circumferentially arranged window apertures 55. The exemplary embodiment shows multiple such window apertures 55 arranged to extend along the entire circumferential periphery of the movable shuttle 54, although in some embodiments a single window aperture extending along a substantial majority of the circumference could be employed. At least some of the window apertures 55 are in alignment with a flow channel 19 provided in the housing 7 along the entire travel stroke of the movable shuttle 54. The flow channel 19, as best seen in FIG. 6 and FIG. 9, fluidly connects to the outlet port 12. The window apertures 55 thus serve as a valve outlet to allow oil that is received into the control valve 5 to exit the control valve 5, and subsequently to be returned back to the vehicle powertrain 2 along the fluid line 73 that is connected to the outlet port 12.

Figure 8:
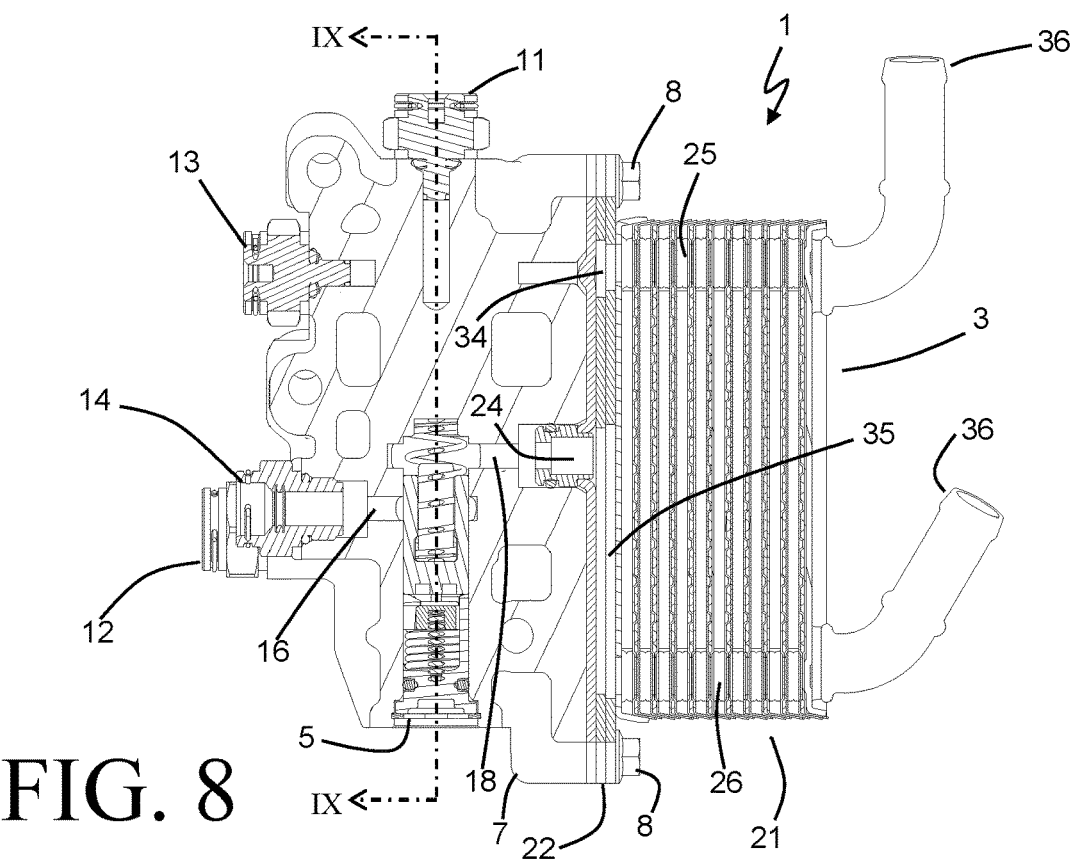
FIG. 8 is a sectional side view of the thermal management unit of FIG. 1, viewed along the lines VIII-VIII of FIG. 5.

An additional flow channel 16 is provided within the housing 7, and is connected to the port 14 to receive a flow of oil along the fluid line 72 from the transmission oil cooler 4, as best seen in FIG. 6 and FIGS. 8-9. Oil received into the flow channel 16 can be directed into the interior of the movable shuttle 54 through at least some of the window apertures 55 when the movable shuttle is in the second operational state position of FIG. 11B, but such flow of oil is prevented when the movable shuttle 54 is in the first operational state position of FIG. 11A. The window apertures 55 thus also function as a valve inlet for the control valve 5, which can be opened and closed in response to the temperature of the oil passing over the sensing element 57.

An additional inlet to the control valve 5 is provided by the open end 66 of the movable shuttle 54. When the movable shuttle 54 is in the first operational state position of FIG. 11A, flow can be received into the open end 66 from a flow channel 18 provided within the housing 7. The flow channel 18 connects to the port 24 of the transmission oil heater 3, as best seen in FIG. 8, and receives oil that has passed through the heater 3. When the movable shuttle 54 transitions to the second operational state position of FIG. 11B, it blocks flow in the channel 18 from reaching the inlet 66.

A shunt flow path 20 is provided within the central bore 42 of the housing 7, and provides a means by which oil received into the thermal management unit 1 through the inlet port 11 can reach the control valve 5 without passing through either the transmission oil heater 3 or the transmission oil cooler 4. The pressure relief valve 6 is located along the shunt flow path 20, and operates to block the flow of oil through the shunt flow path 20 under most conditions. When oil is allowed to flow through the shunt flow path 20, however, then that oil is able to pass through the control valve 5 by way of the inlet 66 regardless of the position of the movable shuttle 54.

FIGS. 11A and 11B depict the flow of oil through the control valve 5 in the two different operating state of the valve. In FIG. 11A movable shuttle 54 is in its first operational state position, corresponding to the temperature of the oil passing over the sensing element 57 being below the minimum threshold. The flow of oil, depicted by the solid arrow, passes from the flow channel 18 into the control valve 5 through the inlet 66, and exits the control valve 5 through the window apertures 55 to the flow channel 19. If the pressure relief valve 6 allows for any flow of oil through the shunt flow path 20, that oil travels along the dashed line and also enters the control valve 5 through the inlet 66, mixing with the oil received from the transmission oil heater 3 within the shuttle 54 of the control valve 5.

When the control valve 5 is in the second operational state position, as shown in FIG. 11B, the actuator 58 is fully extended and the movable shuttle 54 has translated completely to its second operational state position, resulting in the end of the movable shuttle 54 butting up against the shoulder 45. In this position, the shuttle 54 blocks the flow of oil from the flow channel 18, but oil is now able to flow into the control valve 54 from the flow channel 16, as at least some of the area of the window apertures 55 are now aligned with the flow channel 16. Again, any flow of oil through the shunt flow path 20 is received into the control valve 5 through the open end 66 of the movable shuttle 54.

It is especially of note that, in either of the operational states, all of the oil (i.e. both oil that is routed through the heater 3 and/or the cooler 4, and oil that is bypassed through the shunt flow path 20) passes over the sensing element 57. This allows for precise control of the temperature of the oil that is delivered to the vehicle powertrain 2. When the control valve is in the first operational state corresponding to FIG. 11A and the oil is being heated within the oil heater 3, the temperature of the oil passing over the sensing element 57 can eventually reach the threshold temperature at which the actuator 58 begin to extend. This will cause the movable shuttle 54 to translate, and when sufficient movement is achieved the control valve 5 will receive some proportion of flow from the transmission oil cooler 3 through the flow channel 16. An intermediate steady-state condition can be achieved wherein the movable shuttle 54 is at an intermediate position between the extremes of FIG. 11A and FIG. 11B, so that a portion of the oil received into the valve 5 is routed through the oil heater 3 and another portion of the oil received into the valve 5 is routed through the oil cooler 4.

When the temperature of the oil passing over the sensing element reaches the upper threshold, the actuator 58 will have extended sufficiently to displace the movable shuttle 54 so as to engage the shoulder 45. As long as the flow of oil passing over the sensing element 57 is sufficiently warm to maintain the extension of the actuator 58, this position of the valve will ensure that oil is directed through the oil cooler 4 rather than through the oil heater 3. Damage to the control valve 5 caused by over-extension of the actuator 58 (as might result from oil temperatures sufficiently in excess of the upper threshold) can be avoided by the inclusion of an over-stroke prevention spring 60. The over-stroke prevention spring 60 has a higher spring constant than does the spring 59, so that compression of the over-stroke prevention spring 60 does not occur until the movable shuttle 54 engages the shoulder 45.

Figure 12:
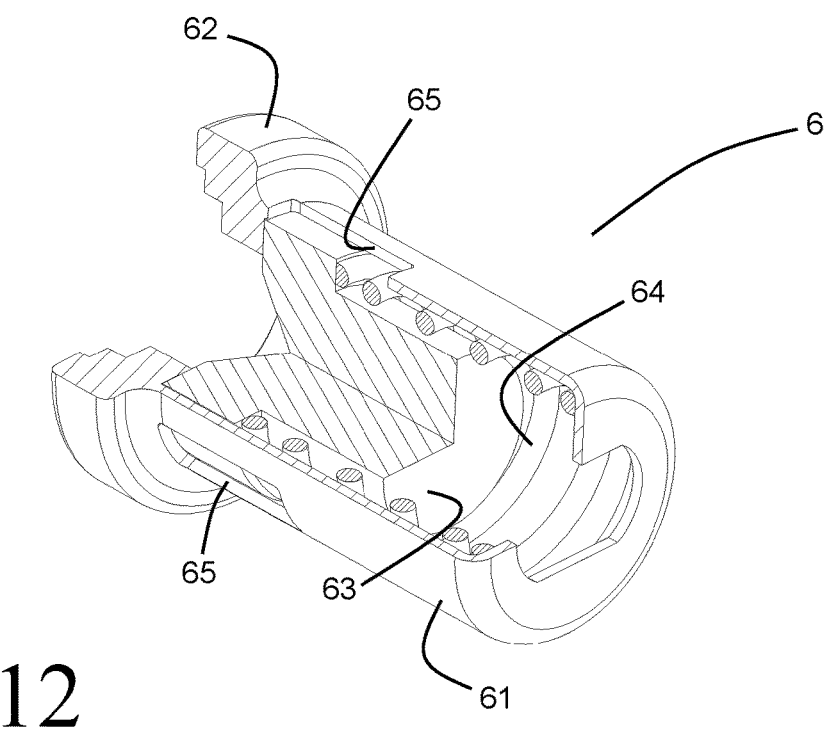
FIG. 12 is a cut-away perspective view of a pressure relief valve of the thermal management unit of FIG. 1.

The pressure relief valve 6 of the exemplary embodiment is shown in greater detail in FIG. 12. The pressure relief valve 6 includes a cap 62 joined to a cylindrical sleeve 61, with the sleeve 61 having an outer diameter that is somewhat smaller than the diameter of the central bore 42 in the region of the shunt flow path 20. A biasing spring 64 and plunger 63 are arranged within the cylindrical sleeve 61. The biasing spring 64 is maintained in a partially compressed state so that the plunger 63 is forced into contact with a seating surface of the cap 62. The cap 62 can be press-fit into the central bore 42 so that flow through the shunt flow path 20 is prevented when the plunger 63 is disposed against the seating surface of the cap 62. The end of the sleeve 61 opposite the cap 62 is at least partially open so that the plunger 63 is exposed to the fluid pressures at both the upstream and the downstream ends of the shunt flow path 20 (i.e. both the pressure at the inlet port 11 and the pressure at the control valve 5). When the difference in pressure across the plunger 63 is sufficient to overcome the biasing force of the spring 64, the plunger will unseat from the cap 62 and oil will be allowed to flow into the shunt flow path 20 through windows 65 provided in the cylindrical sleeve 61.

Allowing for oil flow through the shunt flow path 20 can be advantageous under certain conditions. It is possible for either or both of the heat exchangers 3, 4 to develop clogs along the oil flow path, which can substantially increase the pressure required to force oil through the heat exchanger. Such an increase in head pressure can be damaging to the oil pump, or to the heat exchangers themselves, or to other equipment along the oil circuit. Component damage or failure can be prevented by selecting the biasing force of the spring 63 to be sufficiently low to enable opening the shunt flow path 20 to oil flow prior to reaching such a non-desirable pressure. Furthermore, by integrating the pressure relief valve 6 within the thermal management unit 1 itself, the system can be protected against clogging of both the transmission oil heater 3 and the transmission oil cooler 4. The pressure relief valve 6 is hydraulically in parallel with both of the heat exchangers, so that some amount of the oil can be diverted through the shunt flow path 20 to maintain the pressure head below a threshold limit while allowing the remaining oil to flow through either (or both) of the heat exchangers 3 and 4, depending on the operational state of the control valve 5.

Additional benefits can be derived from the pressure relief valve 6 during startup of the vehicle powertrain 2 under cold ambient temperature conditions. Typical transmission oils are specifically formulated to have a proper viscosity at the expected operating temperature in order to optimize the performance of the vehicle powertrain. These operating temperatures typically are in the range of 80-120 degrees Celsius. As the temperature of the oil decreases, the viscosity tends to increase, and at very cold temperatures (as can be experienced in colder climates) the viscosity tends to increase dramatically. Operating the vehicle powertrain when the transmission oil is at such a low temperature can be problematic in that the high oil viscosity places considerable strain on the oil pump, and can contribute to substantial decreases in fuel economy due to the extra pump work that is required to move the transmission oil through the system. It is nonetheless desirable for the vehicle powertrain to receive a high flow rate of transmission oil.

This high flow rate of highly viscous cold oil can result in substantially high pressure through the system, particularly in the transmission oil heater 3, as the pump works to overcome the viscous resistance to flow. This elevated pressure can again lead to damage in the oil system, or to an undesirable reduction in oil flow. The inclusion of the pressure relief valve 6 mitigates against this issue by allowing for some oil flow through the shunt flow path 20, that oil thereby bypassing the oil heater 3 and reducing the pressure spikes while still allowing for full oil flow through the transmission. The bypassed flow mixes in the control valve 5 with the heated flow being received from the oil heater 3, so that the sensing element is exposed to essentially the mixed temperature of the oil. This prevents against the premature opening of the control valve 5 that would result from an external bypass, wherein only the temperature of the heated oil would be measured by the control valve. Such a premature opening would increase the time required for heating of the oil to the desired operating temperature, thereby decreasing fuel economy.

An alternative embodiment of a thermal management unit 101 according to the present invention is shown in FIGS. 14-17, and will next be described with specific reference to those figures. For ease of description, the alternative embodiment is shown without the accompanying transmission oil heater, although it should be understood that the transmission oil heater 3 of the previously discussed embodiment could be integrated in a similar manner.

The embodiment depicted in FIGS. 14-17 again makes use of a cast housing 107 provided with multiple inlet and outlet ports through which a flow of transmission oil can be routed into and out of the housing 107. The housing 107 is provided with a central bore 142 in which a valve assembly 105 is housed. The valve assembly 105 combines both a control valve that operates to selectively direct the flow of transmission oil through the transmission oil heater, the transmission oil cooler, or both in order to modulate the temperature of the oil, as well as a pressure relief valve to prevent the exposure of either the transmission oil cooler or the transmission oil heater to potentially damaging fluid pressure.

Figure 14:
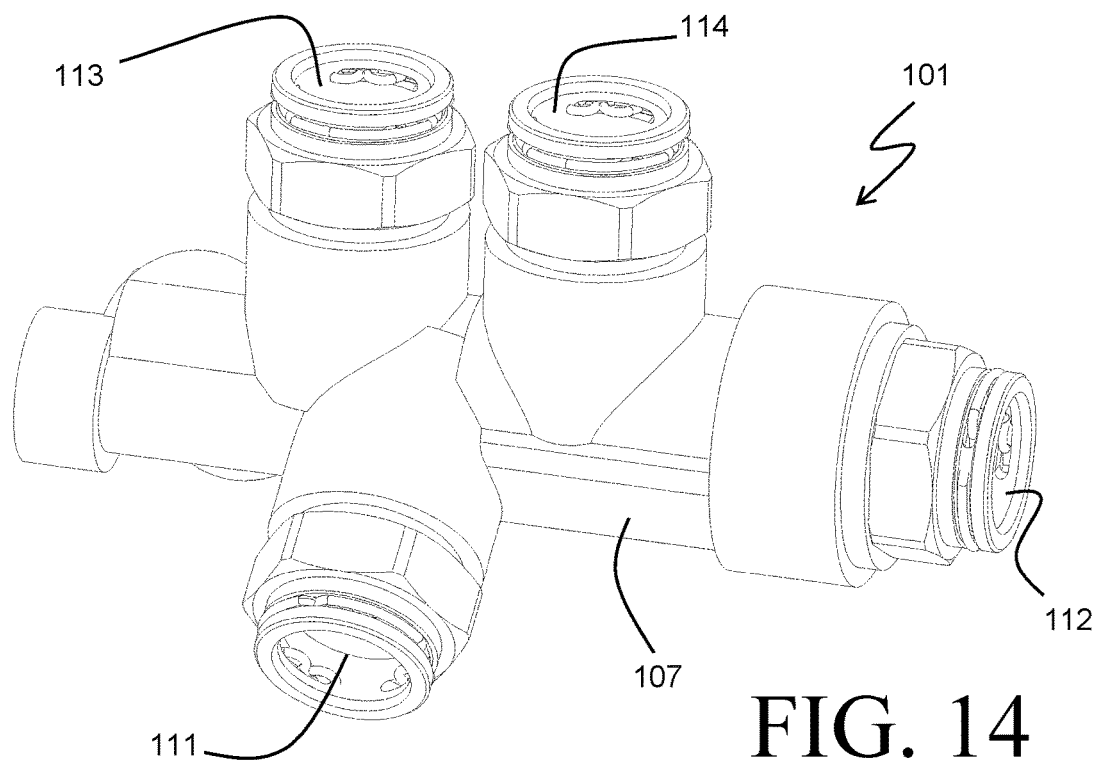
FIG. 14 is a perspective view of a thermal management unit according to another embodiment of the invention.
Figure 15:
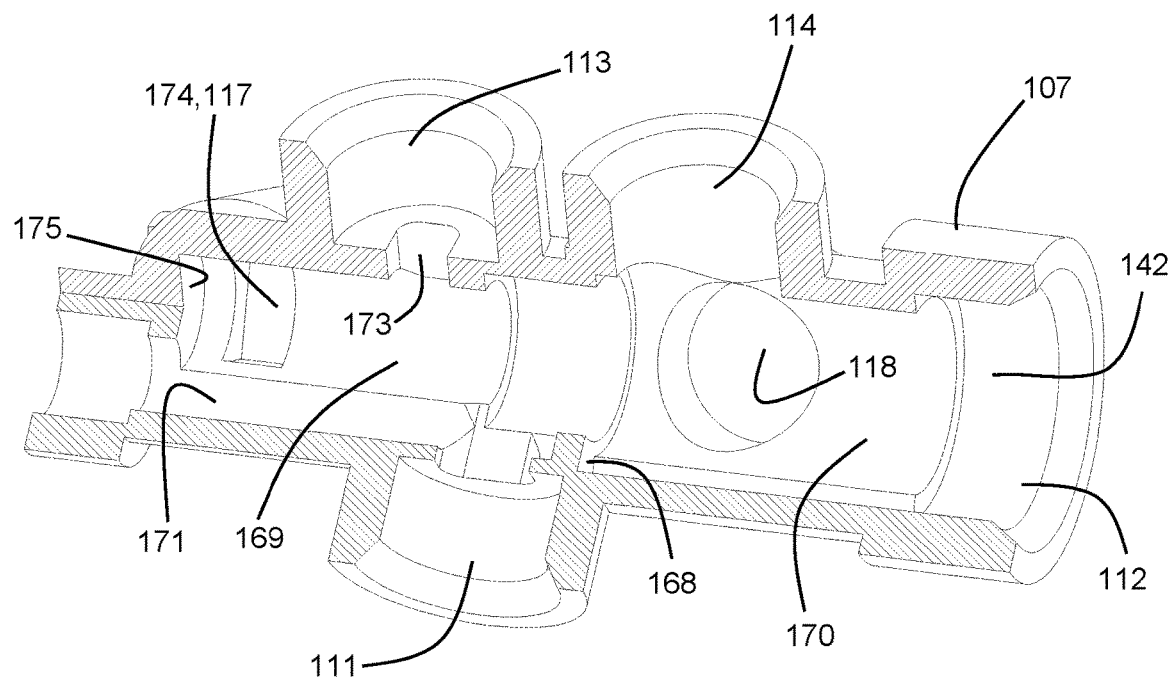
FIG. 15 is a cut-away view of a housing of the embodiment of FIG. 14.

The housing 107 is provided with four ports by which the thermal management unit 101 can be fluidly coupled to a vehicle powertrain. Oil can be received into the thermal management unit 101 from the vehicle powertrain through a port 111, and can be routed back to the vehicle powertrain from a port 112. Additional ports 113 and 114 are provided to allow for the connection of a transmission oil cooler (not shown). In order to facilitate such the coupling to the vehicle powertrain and the oil cooler, the ports can be provided with quick-connect fittings, as shown in FIG. 14. Such fittings are not required, though, and other known methods of securing fluid lines can be alternatively employed.

The central bore 142 includes several regions of progressively reduced diameter to cooperate with various aspects of the valve assembly 105, and extends most of the way (but not completely) through the housing 107. Such a progression of diameters allows the central bore 142 to be readily produced within the housing 107 by casting, machining, or a combination of the two, as any required tooling can enter the bore 142 from the end of the housing 107 where the port 112 is located.

A movable valve shuttle 154 is provided at one extreme end of the valve assembly 105, and is constructed as a hollow cylinder with a diameter that is slightly less than the smallest diameter of the central bore 142. This allows the movable shuttle to axially travel over a portion of the central bore 142 in order to selectively block the flow of oil through either or two apertures (indicated as 173 and 174) that extend transversely through a cylindrical wall of the central bore. A runner channel 171 that is axially offset from the central bore 142 provides a flow channel to allow for the flow of oil from the inlet port 111 to those parts of the terminal portion of the central bore 142 that are not occupied by the shuttle 154, regardless of the position of the shuttle 154 along that portion of the central bore. The runner channel 171 can be produced by casting and/or machining from the end of the housing 107 opposite the port 112, with a plug 172 subsequently inserted into the open end of the runner channel 171 in order to seal off the end of the channel.

A step change in the diameter of the central bore 142 provides a planar surface 168 that operates as a valve seat for a pressure relief valve functionality of the valve assembly 105. The valve assembly 105 includes a planar disc 163 which is normally seated against the valve seat 168 by a biasing spring 164. The valve seat 168 separates the central bore 142 into a first fluid cavity 169 arranged on one side of the valve seat 168, and a second fluid cavity 170 arranged on the opposite side of the valve seat 168. The first fluid cavity 169 includes both the runner channel 171 and the portion of the central bore 142 through which the shuttle 154 is able to travel.

When oil is received into the port 111 it is able to flow into the first fluid cavity 169, but it is prevented from flowing directly into the second fluid cavity 170 by the seated planar disc 163. Depending on the position of the movable shuttle 154, the oil received into the fluid cavity 169 can be removed by way of the aperture 173, the aperture 174, or both. The aperture 173 provides a fluid flow path between the fluid cavity 169 and the port 113, allowing for the flow of oil to the remote oil cooler. The aperture 174 provides a fluid flow path 117 between the fluid cavity 169 and the inlet manifold of the integrated transmission oil heater.

The valve assembly includes a thermally responsive sensing element 157 that is positioned within the fluid cavity 170, and that operates similar to the sensing element 57 of the thermal management unit 1 previously described. Oil is able to enter into the fluid cavity 170 from the remote oil cooler by way of the fluid port 115, so long as the flow of oil through the aperture 173 is not blocked by the shuttle 154. Oil is also to enter the fluid cavity 170 from the oil heater by way of a flow path 118, so long as the flow of oil through the aperture 174 is not blocked by the shuttle 154. Regardless of the source, any oil received into the fluid cavity 170 is directed over the sensing element 157. Apertures 167 are provided in an end cap 151 of the valve assembly 105, and allow for the flow of oil from the fluid cavity 170 to the port 112, from which the oil is returned to the vehicle powertrain.

Figure 16A:
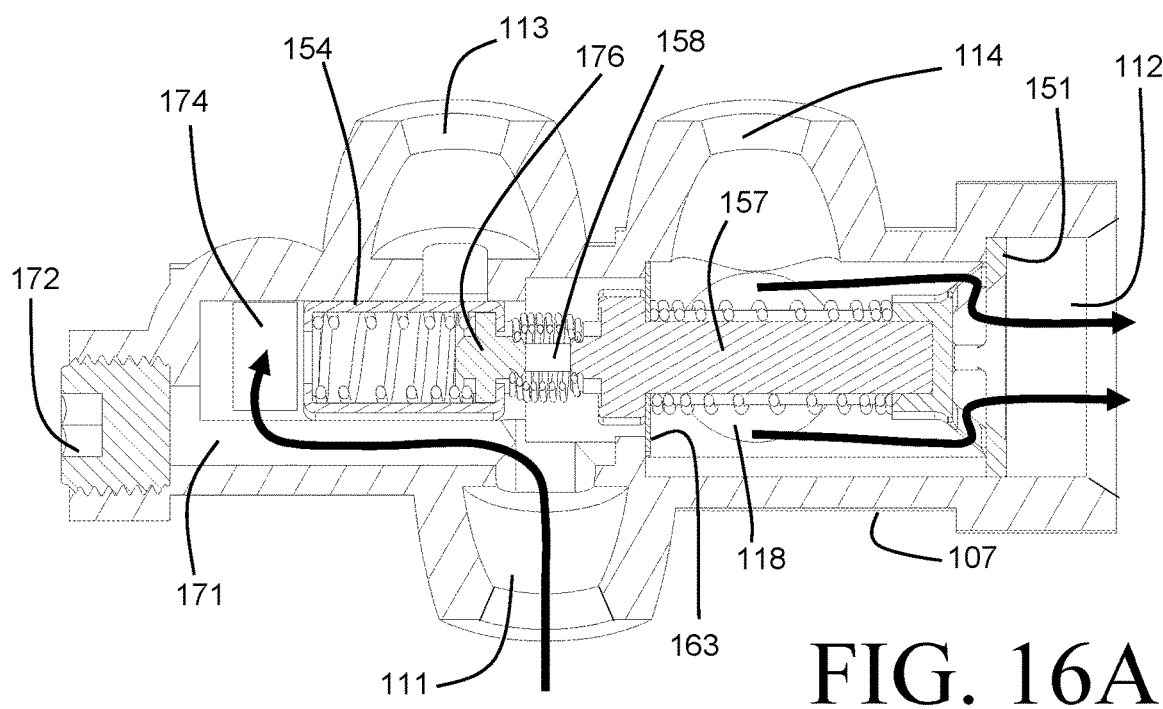
FIGS. 16A-16D are sectional side views of the embodiment of FIG. 14, shown in four different operating states.

FIG. 16A shows the operation of the thermal management unit 101 when the oil is cold, as may occur when the vehicle has been in a non-operating condition for hours in a low-temperature ambient environment. The flow of oil through the thermal management unit 101 is depicted by the solid arrows. In such an operating condition the movable shuttle 154 is positioned so that flow of oil through the aperture 173 is fully blocked, but flow through the aperture 174 is unblocked. The oil is thereby directed into the transmission oil heater, where it is heated before being returned through the flow channel 118. The heated oil passes over the sensing element 157, and exits the thermal management unit 101 through the port 112.

The sensing element 157 of the exemplary embodiment is a wax motor device. As the temperature of the oil received from the transmission oil heater reaches the melting point of the wax contained within the sensing element 157, the resulting change of phase of the wax causes it to expand. The expansion of the wax extends the actuator 158, which is coupled to the movable shuttle 154 by a cap 176. A return spring 159 is used to maintain the actuator 158 in the withdrawn position when the oil temperature is below the actuation temperature, but is selected so that the expansion of the wax provides a force sufficient to overcome the tensile force applied by the return spring 159.

Figure 16B:
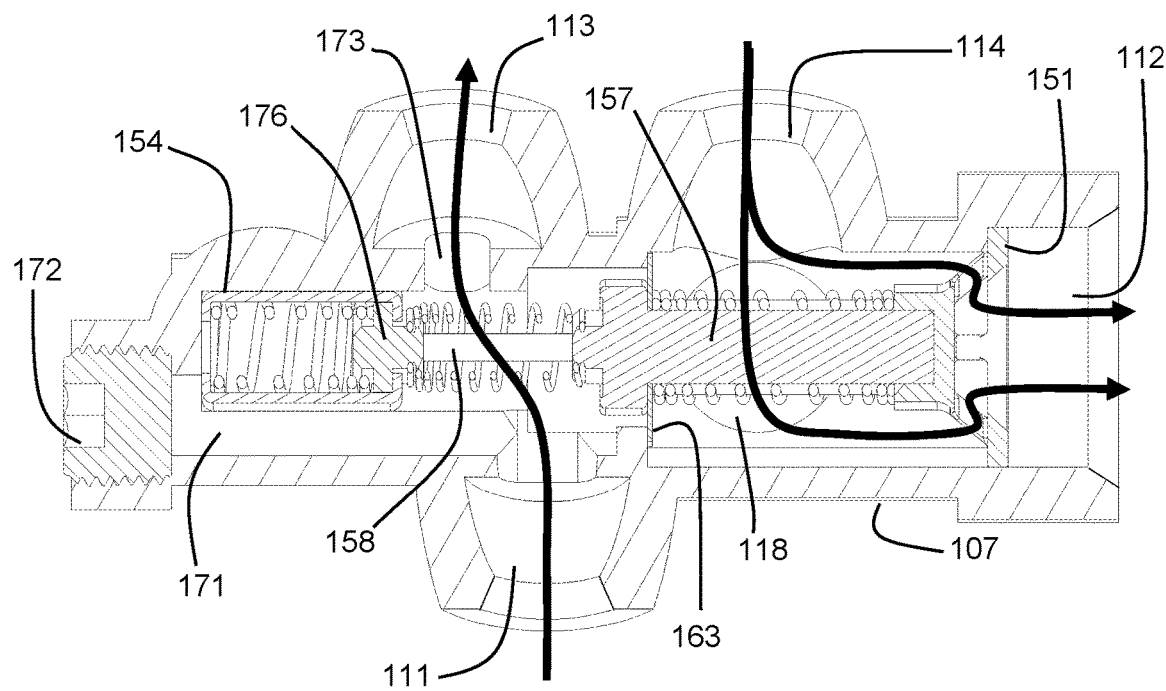

FIG. 16B shows the operation of the thermal management unit 101 when the oil entering through the port 111 is at a sufficiently high temperature as to require cooling of the oil before it is returned to the vehicle powertrain. The movable shuttle 154 has reached its full extent of travel, so that the aperture 174 is fully closed to flow and the aperture 173 is fully open to flow. To prevent further travel of the shuttle 154 beyond such a point, the end of the shuttle 154 is disposed against the end face 175 of the central bore 142. An over-stroke spring 160 is provided within the movable shuttle 154 to allow for some additional extension of the actuator 158 once the movable shuttle 154 contacts the face 175, thereby avoiding any damage to the sensing element 157 that might be caused by overheating of the wax.

During such an operating condition, the oil passes from the inlet port 111 to the port 113, and is routed by oil lines to a transmission oil cooler. The oil, after being cooled within the oil cooler, is returned through the port 114 and again passes over the sensing element 157 before being returned to the vehicle powertrain through the port 112.

Figure 16C:
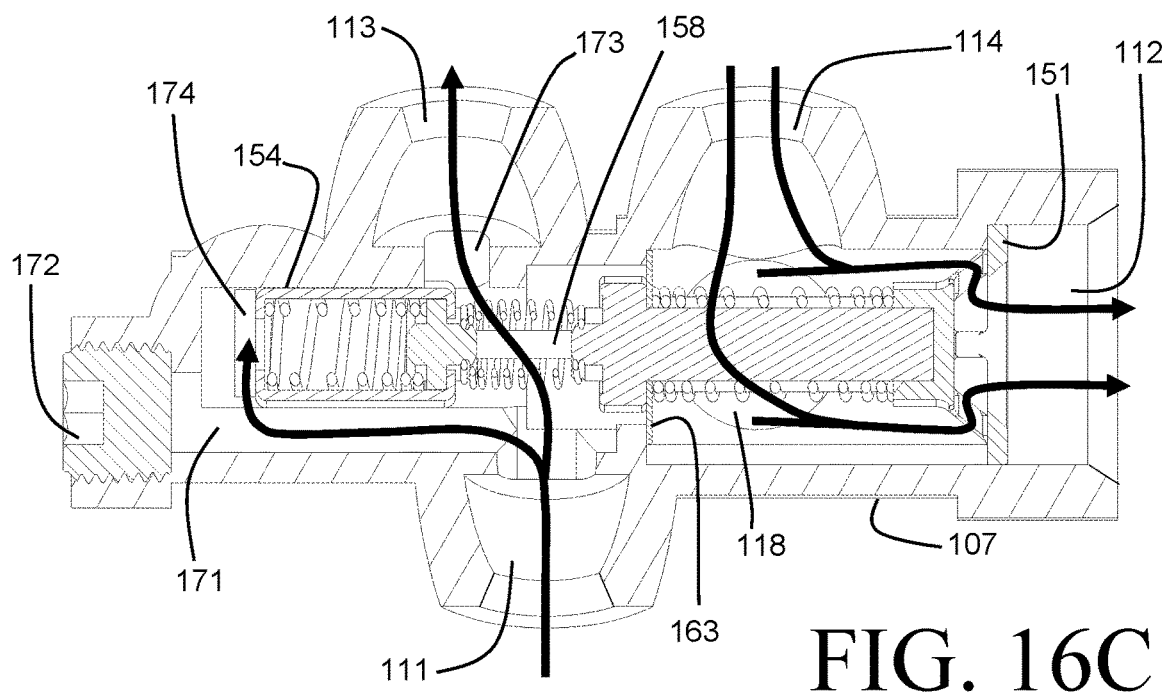

A variety of intermediate positions for the movable shuttle 154 exist between the first position depicted in FIG. 16A and the second position depicted in FIG. 16B. FIG. 16C shows one such intermediate position, wherein both the aperture 173 and the aperture 174 are partially open to flow from the fluid cavity 169. As a result, oil is routed to both the oil heater and the oil cooler, and a mixed flow of oil from both of these is received into the fluid cavity 170. The resultant mixed oil temperature is sensed by the sensing element 157, and the position of the movable shuttle 154 is adjusted in response to that temperature. As the movement of the shuttle 154 adjusts the split of the flow between the oil heater and the oil cooler, precise regulation of the temperature of the oil delivered to the vehicle powertrain through the port 112 can be achieved.

Figure 16D:
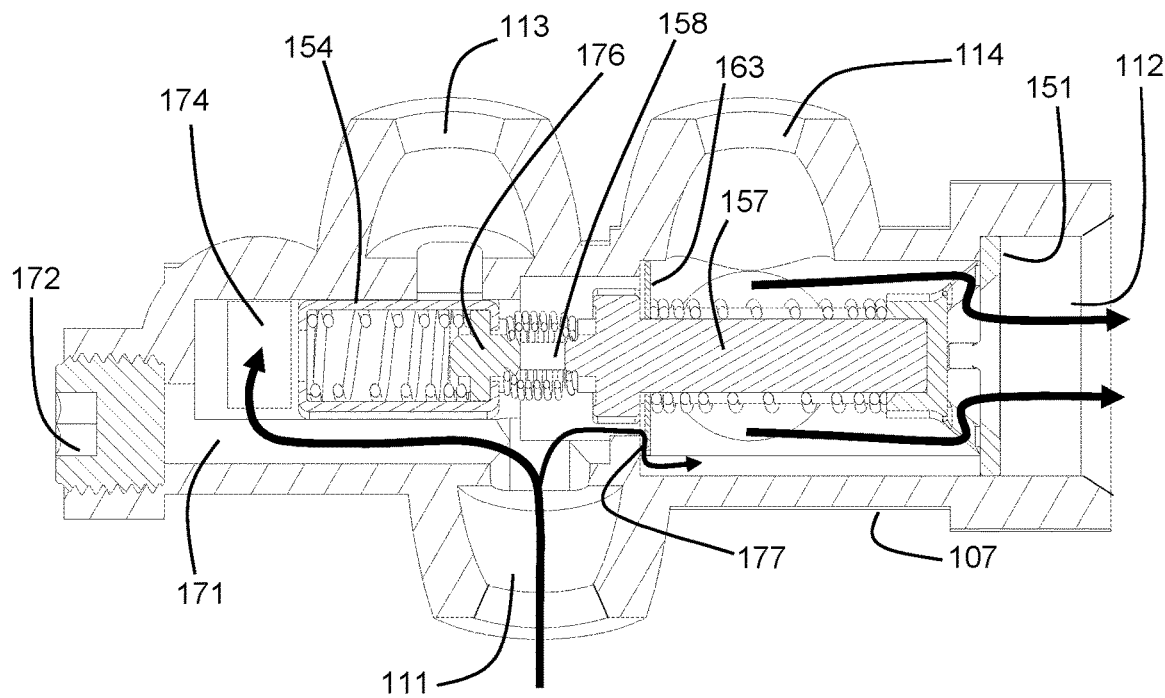
Figure 17:
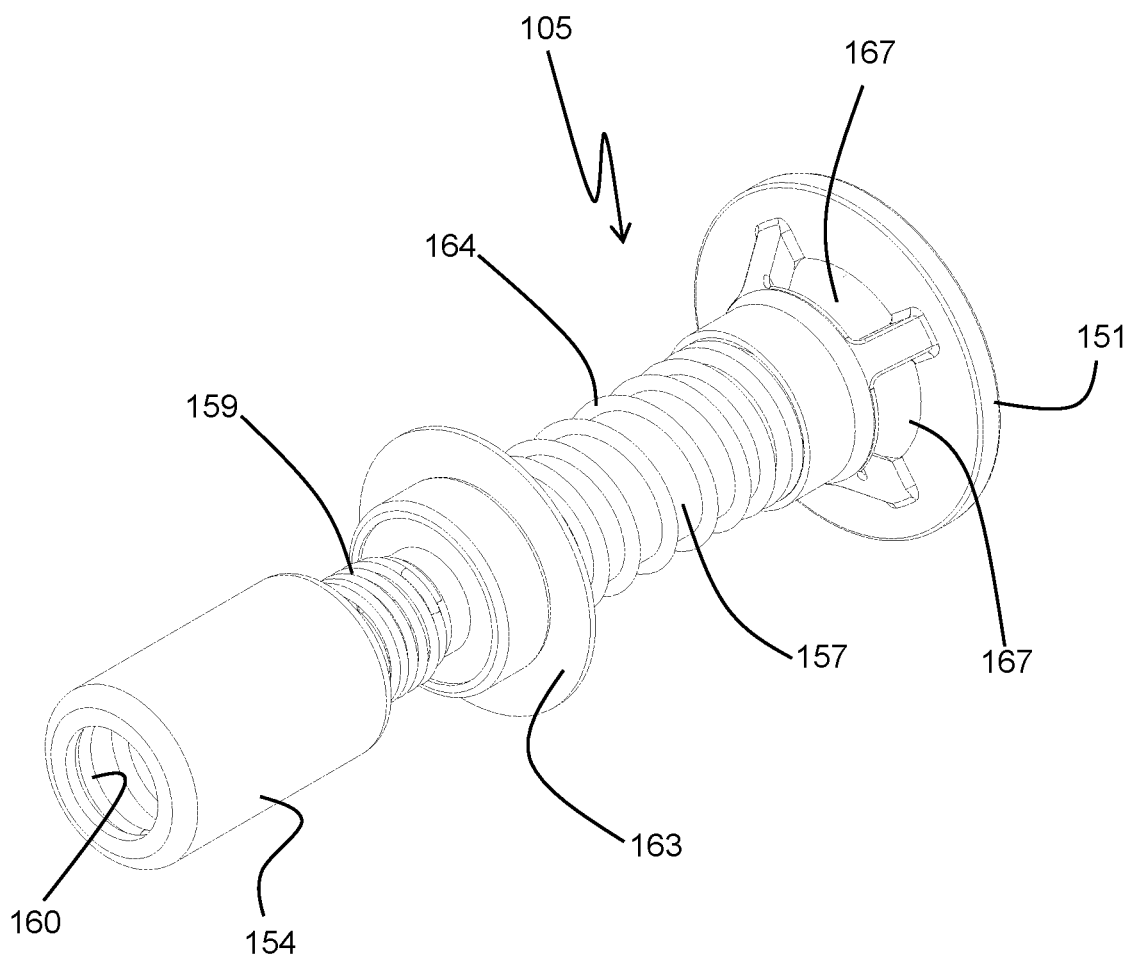
FIG. 17 is a perspective view of a valve assembly of the embodiment of FIG. 14.

The valve assembly 105 provides overpressure protection for both the oil cooler and the oil heater. FIG. 16D shows the thermal management unit operating in overpressure protection mode when the oil is cold. As previously mentioned, such a need is likely to arise due to the high viscosity of the oil at low temperatures, and the resultant elevated pressures associated with moving the oil through the system. When the pressure required to move the oil through the transmission oil heater exceeds a certain threshold level, the forces acting on the face of the planar disc 163 by the pressure of the oil in the fluid cavity 169 exceed the forces acting on the opposing face of the disc 163 by the pressure of the oil in the fluid cavity 170 and the force applied by the spring 164, which is normally in a partially compressed state. These forces cause the disc 163 to be displaced form the valve seat 168, thereby creating a shunt flow path 177 directly from the fluid cavity 169 to the fluid cavity 170. As a portion of the flow of oil travels along the shunt flow path 177, the reduction in the flow rate of oil through the oil heater will reduce the pressure differential between the fluid cavity 169 and the fluid cavity 170. The extent to which the shunt flow path 177 is open to flow will be varied accordingly, until the pressure differential in sufficient to overcome the force applied by the spring 164, at which point the disc 163 will be re-seated and the shunt flow path will be closed. Accordingly, the characteristics of the spring 164 can be selected to define the threshold pressure differential at which the pressure relief capability is activated. While FIG. 16D illustrates operation in the oil heating mode, it should be apparent that the pressure relief capability can be activated regardless of the position of the movable shuttle 154, and both the oil heater and the oil cooler can be protected from excessive pressures.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

We claim:

1. A thermal management unit for routing a flow of oil through a vehicle powertrain, comprising:
    a valve housing including a first fluid cavity, a second fluid cavity, a valve seat separating the first and second fluid cavities, a first inlet and first and second outlets for the first fluid cavity, a third outlet for the second fluid cavity, and one or more second inlets for the second fluid cavity; and
    a control valve arranged within the valve housing, the control valve comprising:
        a temperature sensing element disposed within the second fluid cavity;
        a movable shuttle disposed within the first fluid cavity and controlled by the temperature sensing element to selectively route fluid between the first inlet and the first and second outlets; and
        a pressure relief valve element disposed within the second fluid cavity and responsive to a pressure differential between fluid in the first fluid cavity and fluid in the second fluid cavity, the pressure relief valve element directly abutting the valve seat when the pressure differential is below a threshold value and displaced from the valve seat when the pressure differential is above the threshold value.

2. The thermal management unit of claim 1, wherein the movable shuttle has a range of travel bounded by a first position and a second position, wherein flow between the first fluid cavity and the first outlet is blocked by the movable shuttle in the first position and flow between the first fluid cavity and the second outlet is blocked by the movable shuttle in the second position.

3. The thermal management unit of claim 1, wherein the first fluid cavity comprises a cylindrical bore and wherein the movable shuttle comprises a cylinder slidably received within the cylindrical bore.

4. The thermal management unit of claim 1, wherein the pressure relief valve element comprises a planar disc with an aperture, the temperature sensing element includes an actuator, and the actuator extends through the aperture.

5. The thermal management unit of claim 1, further comprising a biasing spring to maintain a fluid-tight seal between the pressure relief valve element and the valve seat when the pressure differential is below the threshold value.

6. A thermal management unit for a vehicle powertrain, comprising:
    a first fluid port to receive a flow of oil from the vehicle powertrain;
    a second fluid port to deliver a flow of oil to the vehicle powertrain;
    a third fluid port fluidly connected to the first fluid port by way of a first flow path extending through the thermal management unit;
    a fourth fluid port fluidly connected to the second fluid port by way of a second flow path extending through the thermal management unit;
    an integrated transmission oil heater having a fluid inlet manifold, a fluid outlet manifold, and a plurality of flow structures extending between the fluid inlet manifold and the fluid outlet manifold, wherein the fluid inlet manifold is fluidly connected to the first fluid port by way of a third flow path extending through the thermal management unit and the fluid outlet manifold is fluidly connected to the second fluid port by way of a fourth flow path extending through the thermal management unit;
    a control valve shuttle movably disposed within the thermal management unit to selectively block flow along one of the third and fourth flow paths and along one of the first and second flow paths;
    a shunt flow path extending through the thermal management unit between the first and the second fluid ports, wherein flow along the shunt flow path bypasses the third fluid port, the fourth fluid port, and the integrated transmission oil heater; and
    a pressure relief valve arranged along the shunt flow path to block the flow of oil along the shunt flow path when the pressure differential between the first and second fluid ports is below a threshold, and to allow flow of oil along the shunt flow path when said pressure differential exceeds said threshold.

7. The thermal management unit of claim 6, wherein the control valve shuttle is movable between a first position and a second position, wherein flow of oil through the integrated transmission oil heater is completely blocked when the control valve shuttle is in the first position and is unblocked when the control valve shuttle is in the second position.

8. The thermal management unit of claim 7, wherein the flow of oil through the third fluid port is completely blocked when the control valve shuttle is in the second position.

9. The thermal management unit of claim 6, further comprising a sensing element arranged within the housing so that fluid flowing along both the second and the fourth fluid flow paths passes over the sensing element, wherein movement of the control valve shuttle is in response to the temperature sensed by the sensing element.

10. The thermal management unit of claim 9, further comprising a structure having a central bore extending linearly therethrough and in which both the control valve shuttle and the sensing element are housed, wherein the pressure relief valve divides the central bore into a first fluid volume containing the control valve shuttle and a second fluid volume containing the sensing element.

11. The thermal management unit of claim 9, wherein the control valve shuttle, the sensing element, and the pressure relief valve are integrated into a single valve assembly that is inserted into the thermal management unit.

12. The thermal management unit of claim 9, wherein the entire flow of oil entering through the first fluid port is directed over the sensing element.

13. The thermal management unit of claim 9, wherein the sensing element is a wax motor.

14. The thermal management unit of claim 9, wherein the pressure relief valve comprises a planar disc having a central aperture, the temperature sensing element includes an actuator, and the actuator extends through the aperture.

* * * * *